United States Patent
Zhong et al.

(10) Patent No.: US 12,301,105 B2
(45) Date of Patent: May 13, 2025

(54) RESONANT CONVERTER AND VOLTAGE CONVERSION METHOD

(71) Applicant: Huawei Digital Power Technologies Co., Ltd., Shenzhen (CN)

(72) Inventors: Shu Zhong, Dongguan (CN); Zejie Lv, Dongguan (CN); Liqiong Yi, Shenzhen (CN); Denghai Pan, Shenzhen (CN); Yuping Qiu, Dongguan (CN); Zezhou Yang, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 156 days.

(21) Appl. No.: 18/147,177

(22) Filed: Dec. 28, 2022

(65) Prior Publication Data

US 2023/0136512 A1 May 4, 2023

Related U.S. Application Data

(63) Continuation of application No. PCT/CN2020/099052, filed on Jun. 29, 2020.

(51) Int. Cl.
*H02M 3/335* (2006.01)
*H02M 3/00* (2006.01)

(52) U.S. Cl.
CPC ......... *H02M 3/01* (2021.05); *H02M 3/33569* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS

| 10,135,359 | B2 | 11/2018 | Chen et al. | |
|---|---|---|---|---|
| 2011/0310640 | A1* | 12/2011 | Tao | H02M 3/3376 363/34 |
| 2014/0036545 | A1 | 2/2014 | Reddy | |

(Continued)

FOREIGN PATENT DOCUMENTS

| CN | 106655793 A | 5/2017 |
|---|---|---|
| CN | 106411139 B | 8/2019 |
| CN | 111181408 A | 5/2020 |

OTHER PUBLICATIONS

Cao et al., "Wide Voltage Gain Range LLC DC/DC Topologies: State-of-the-Art", IEEE, The 2018 International Power Electronics Conference, May 20-24, 2018, 8 pages.

(Continued)

*Primary Examiner* — Sean Kayes
*Assistant Examiner* — Nusrat Quddus
(74) *Attorney, Agent, or Firm* — Maier & Maier, PLLC

(57) ABSTRACT

A resonant converter and a voltage conversion method. The resonant converter includes a high-frequency inversion circuit, an inductor-inductor-capacitor (LLC) resonant tank network, and a hybrid rectification circuit. The LLC resonant tank network is separately coupled to the high-frequency inversion circuit and the hybrid rectification circuit. The high-frequency inversion circuit is configured to convert a first direct current voltage into a first alternating current voltage. The LLC resonant tank network is configured to adjust the first alternating current voltage to obtain a second alternating current voltage.

13 Claims, 19 Drawing Sheets

(58) Field of Classification Search
CPC ............... H02M 3/28; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 1/12; H02M 3/3155; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 7/1552; H02M 7/1623; H02M 1/4225; H02M 3/073; H02M 3/10; H02M 3/135; H02M 3/137; H02M 7/10; H02M 7/00; H02M 7/06; H02M 7/064; H02M 7/068; Y02B 70/1491; G05F 1/30; G05F 1/33; G05F 1/32; G05F 1/34; G05F 1/38; G05F 1/52; H02J 7/12

See application file for complete search history.

(56) References Cited

U.S. PATENT DOCUMENTS

| | | |
|---|---|---|
| 2015/0124487 A1 | 5/2015 | Fu et al. |
| 2019/0089260 A1 | 3/2019 | Boysen |
| 2019/0288607 A1* | 9/2019 | Zong ................. H02M 3/33584 |

OTHER PUBLICATIONS

Zong et al., "Double voltage rectification modulation for bidirectional CLLLC resonant converter for wide voltage range operation", 2018 IEEE International Power Electronics and Application Conference and Exposition (PEAC), IEEE, Nov. 4, 2018, pp. 1-6.

Tang et al., "An Improved LLC Resonant Converter With Reconfigurable Hybrid Voltage Multiplier and PWM-Plus-PFM Hybrid Control for Wide Output Range Applications", IEEE Transactions on Power Electronics, Institute ofElectrical and Electronics Engineers, USA, vol. 35, No. 1, Jan. 2020, pp. 185-197.

* cited by examiner

RESONANT CONVERTER AND VOLTAGE CONVERSION METHOD

CROSS-REFERENCE TO RELATED APPLICATIONS

This application is a continuation of International Application No. PCT/CN2020/099052, filed on Jun. 29, 2020, the disclosure of which is hereby incorporated by reference in its entirety.

TECHNICAL FIELD

The embodiments relate to the field of electronic circuit technologies, a resonant converter, and a voltage conversion method.

BACKGROUND

As one type of DC-DC converter, an inductor-inductor-capacitor (LLC) resonant direct current (DC)-DC converter is widely used in the communication and energy field due to high conversion efficiency. However, when an input-output voltage of the LLC resonant DC-DC converter needs to be adjusted in a wide range, conversion efficiency of the LLC resonant DC-DC converter is low.

SUMMARY

The embodiments may provide a resonant converter and a voltage conversion method, so that the resonant converter implements high conversion efficiency during wide input-output voltage power conversion.

A first aspect provides a resonant converter. The resonant converter may include a high-frequency inversion circuit, an LLC resonant tank network, and a hybrid rectification circuit. The LLC resonant tank network is separately coupled to the high-frequency inversion circuit and the hybrid rectification circuit. The high-frequency inversion circuit is configured to convert a first direct current voltage into a first alternating current voltage. The LLC resonant tank network is configured to adjust the first alternating current voltage to obtain a second alternating current voltage. The hybrid rectification circuit works in a full-bridge rectification mode when a direct current voltage adjustment gain falls within a first threshold range, or works in a voltage doubling rectification mode when a direct current voltage adjustment gain falls within a second threshold range, to convert the second alternating current voltage into a second direct current voltage for output, where the direct current voltage adjustment gain is a ratio of the second direct current voltage to the first direct current voltage.

In the embodiments, when the direct current voltage adjustment gain falls within the first threshold range, the hybrid rectification circuit of the resonant converter may work in the full-bridge rectification mode to convert the second alternating current voltage into the second direct current voltage for output. When the direct current voltage adjustment gain falls within the second threshold range, the hybrid rectification circuit of the resonant converter may work in the voltage doubling rectification mode to convert the second alternating current voltage into the second direct current voltage for output. The hybrid rectification circuit is switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

In a possible implementation, the resonant converter further includes a voltage conversion circuit. The voltage conversion circuit is separately coupled to the high-frequency inversion circuit and the LLC resonant tank network. The voltage conversion circuit is configured to adjust the first alternating current voltage to obtain a third alternating current voltage. That the LLC resonant tank network adjusts the first alternating current voltage to obtain a second alternating current voltage includes: The LLC resonant tank network adjusts the third alternating current voltage to obtain the second alternating current voltage.

In the embodiments, the resonant converter may further include the voltage conversion circuit. When the voltage conversion circuit performs voltage conversion, a primary side coil and a secondary side coil may be electrically isolated.

In a possible implementation, the resonant converter further includes a voltage conversion circuit. The voltage conversion circuit is separately coupled to the LLC resonant tank network and the hybrid rectification circuit. The voltage conversion circuit is configured to adjust the second alternating current voltage to obtain a fourth alternating current voltage. That the hybrid rectification circuit works in a full-bridge rectification mode when a direct current voltage adjustment gain falls within a first threshold range, or works in a voltage doubling rectification mode when a direct current voltage adjustment gain falls within a second threshold range, to convert the second alternating current voltage into a second direct current voltage includes: The hybrid rectification circuit works in the full-bridge rectification mode when the direct current voltage adjustment gain falls within the first threshold range, or works in the voltage doubling rectification mode when the direct current voltage adjustment gain falls within the second threshold range, to convert the fourth alternating current voltage into the second direct current voltage for output.

In the embodiments, the resonant converter may further include the voltage conversion circuit. When the voltage conversion circuit performs voltage conversion, a primary side coil and a secondary side coil may be electrically isolated.

In a possible implementation, the high-frequency inversion circuit is any high-frequency inversion circuit in a half-bridge inversion circuit, a full-bridge inversion circuit, and a three-level inversion circuit.

In a possible implementation, the LLC resonant tank network includes a first capacitor, a first inductor, and a second inductor.

In a possible implementation, a first end of the first inductor and a first end of the first capacitor are respectively coupled to two output ends of the high-frequency inversion circuit, a second end of the first inductor and a second end of the first capacitor are respectively coupled to two ends of the second inductor, and the two ends of the second inductor are respectively coupled to two input ends of the hybrid rectification circuit. Alternatively, a first end of the first inductor and a first end of the second inductor are respectively coupled to two output ends of the high-frequency inversion circuit, a second end of the first inductor and a second end of the second inductor are respectively coupled to two ends of the first capacitor, and two ends of the second inductor are respectively coupled to two input ends of the hybrid rectification circuit. Alternatively, a first end of the first capacitor and a first end of the second inductor are respectively coupled to two output ends of the high-frequency inversion circuit, a second end of the first capacitor and a second end of the second inductor are respectively coupled to two ends of the first inductor, and two ends of the second inductor are respectively coupled to two input ends of the hybrid rectification circuit.

In a possible implementation, the hybrid rectification circuit includes a second capacitor and a rectifier bridge. A first input end of the rectifier bridge is coupled to a first end of the second capacitor, a second end of the second capacitor is coupled to a first output end of the LLC resonant tank network, a second input end of the rectifier bridge is coupled to a second output end of the LLC resonant tank network, and two output ends of the rectifier bridge are used as output ends of the resonant converter. The rectifier bridge may include a plurality of switching transistors or may include at least one diode and at least one switching transistor.

In the embodiments, the hybrid rectification circuit of the resonant converter includes the second capacitor and the rectifier bridge. The second capacitor may implement the following: When the direct current voltage adjustment gain falls within the second threshold range, the hybrid rectification circuit works in the voltage doubling rectification mode, to convert the second alternating current voltage into the second direct current voltage for output. It may be understood that only one capacitor needs to be added to the hybrid rectification circuit, and the following can be implemented without adding a bidirectional switching transistor: When the direct current voltage adjustment gain falls within different ranges, the hybrid rectification circuit is switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

In a possible implementation, the voltage conversion circuit includes a third inductor and a transformer. Two ends of the third inductor are respectively coupled to two output ends of the high-frequency inversion circuit, the two ends of the third inductor are respectively coupled to two ends of a primary side of the transformer, and two ends of a secondary side of the transformer are respectively coupled to two input ends of the LLC resonant tank network. Alternatively, two ends of the third inductor are respectively coupled to two output ends of the LLC resonant tank network, the two ends of the third inductor are respectively coupled to two ends of a primary side of the transformer, and two ends of a secondary side of the transformer are respectively coupled to two input ends of the hybrid rectification circuit.

A second aspect provides a voltage conversion method. The method is applied to the resonant converter provided in the first aspect, the resonant converter includes a high-frequency inversion circuit, an LLC resonant tank network, and a hybrid rectification circuit, and the method includes: converting a first direct current voltage into a first alternating current voltage by using the high-frequency inversion circuit; adjusting the first alternating current voltage by using the LLC resonant tank network to obtain a second alternating current voltage; and enabling, when a direct current voltage adjustment gain falls within a first threshold range, the hybrid rectification circuit to work in a full-bridge rectification mode to convert the second alternating current voltage into a second direct current voltage for output; or enabling, when a direct current voltage adjustment gain falls within a second threshold range, the hybrid rectification circuit to work in a voltage doubling rectification mode to convert the second alternating current voltage into a second direct current voltage.

In the embodiments, when the direct current voltage adjustment gain falls within the first threshold range, the hybrid rectification circuit may work in the full-bridge rectification mode to convert the second alternating current voltage into the second direct current voltage for output. When the direct current voltage adjustment gain falls within the second threshold range, the hybrid rectification circuit may work in the voltage doubling rectification mode to convert the second alternating current voltage into the second direct current voltage for output. The hybrid rectification circuit is switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

In a possible implementation, the resonant converter further includes a voltage conversion circuit, and the method further includes: adjusting the voltage of the first alternating current by using the voltage conversion circuit to obtain a third alternating current. The adjusting the voltage of the first alternating current by using the LLC resonant tank network to obtain a second alternating current includes: adjusting the voltage of the third alternating current by using the LLC resonant tank network to obtain the second alternating current.

In a possible implementation, the resonant converter further includes a voltage conversion circuit, and the method further includes: adjusting the voltage of the second alternating current by using the voltage conversion circuit to obtain a fourth alternating current voltage. The enabling, when a direct current voltage adjustment gain falls within a first threshold range, the hybrid rectification circuit to work in a full-bridge rectification mode to convert the second alternating current voltage into a second direct current voltage for output includes: enabling, when the direct current voltage adjustment gain falls within the first threshold range, the hybrid rectification circuit to work in the full-bridge rectification mode to convert the fourth alternating current voltage into the second direct current voltage. The enabling, when a direct current voltage adjustment gain falls within a second threshold range, the hybrid rectification circuit to work in a voltage doubling rectification mode to convert the second alternating current voltage into a second direct current voltage for output includes: enabling, when the direct current voltage adjustment gain falls within the second threshold range, the hybrid rectification circuit to work in the voltage doubling rectification mode to convert the fourth alternating current voltage into the second direct current voltage for output.

DETAILED DESCRIPTION OF THE EMBODIMENTS

The embodiments may provide a resonant converter and a voltage conversion method, so that the resonant converter implements high conversion efficiency during wide input-output voltage power conversion. The following describes the embodiments in detail with reference to the accompanying drawings. It is clear that the described embodiments are merely some, but not all, of the embodiments.

Figure 1:
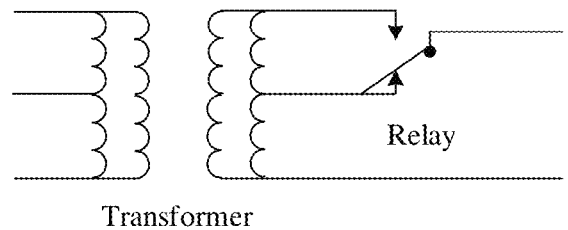
FIG. 1 is a schematic diagram of a structure of a transformer according to an embodiment.

To facilitate better understanding of the resonant converter and the voltage conversion method provided in the embodiments, the following first describes an application scenario of the embodiments. A DC-DC converter is a voltage converter that effectively outputs a fixed voltage after converting an input voltage. Generally, the DC-DC converter includes an inversion circuit, a transformer, and a rectification circuit. To enable an output voltage of the DC-DC converter to change in a wide range, FIG. 1 is a schematic diagram of a structure of a transformer according to an embodiment. As shown in FIG. 1, a relay may be connected in series on a secondary-side winding of the transformer, and a turn ratio between a primary-side winding and the secondary-side winding is adjusted by using the relay, to adjust an output voltage. However, the relay cannot implement online fast switching, and a circuit needs to be powered off when the turn ratio is switched. This limits application of the relay.

As one type of DC-DC converter, an LLC resonant converter can implement a zero voltage switch (ZVS) of a primary-side switching transistor and a zero current switch (ZCS) of a secondary-side rectifier, and therefore has high conversion efficiency. The LLC resonant converter may adjust a gain of the LLC resonant converter by adjusting a frequency of a switching transistor, so that an output voltage of the LLC resonant converter can be adjusted in a range. Generally, the frequency of the switching transistor is adjusted in a range. Therefore, a change range of the output voltage of the LLC resonant converter is also fixed. When a change range of the frequency of the switching transistor is specified, if the change range of the output voltage is increased, conversion efficiency of the LLC resonant converter is reduced.

Figure 2:
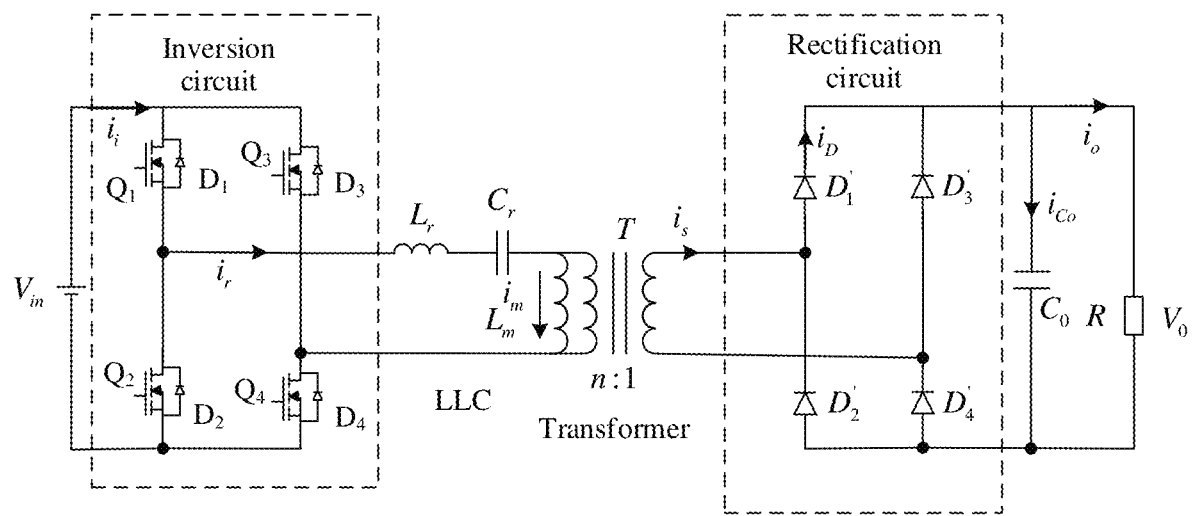
FIG. 2 is a schematic diagram of a structure of a resonant converter according to an embodiment.
Figure 2:
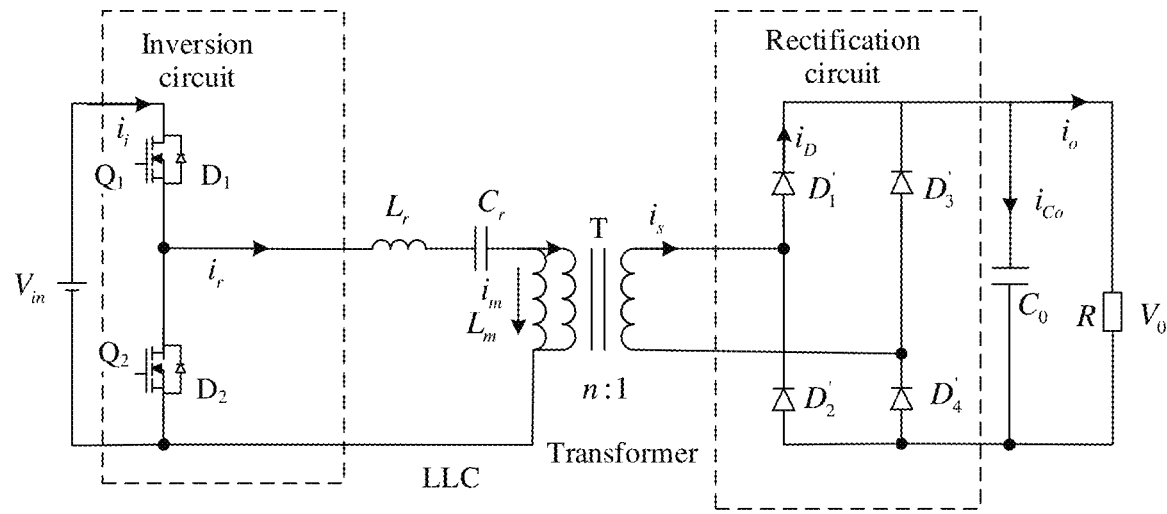
Figure 3:
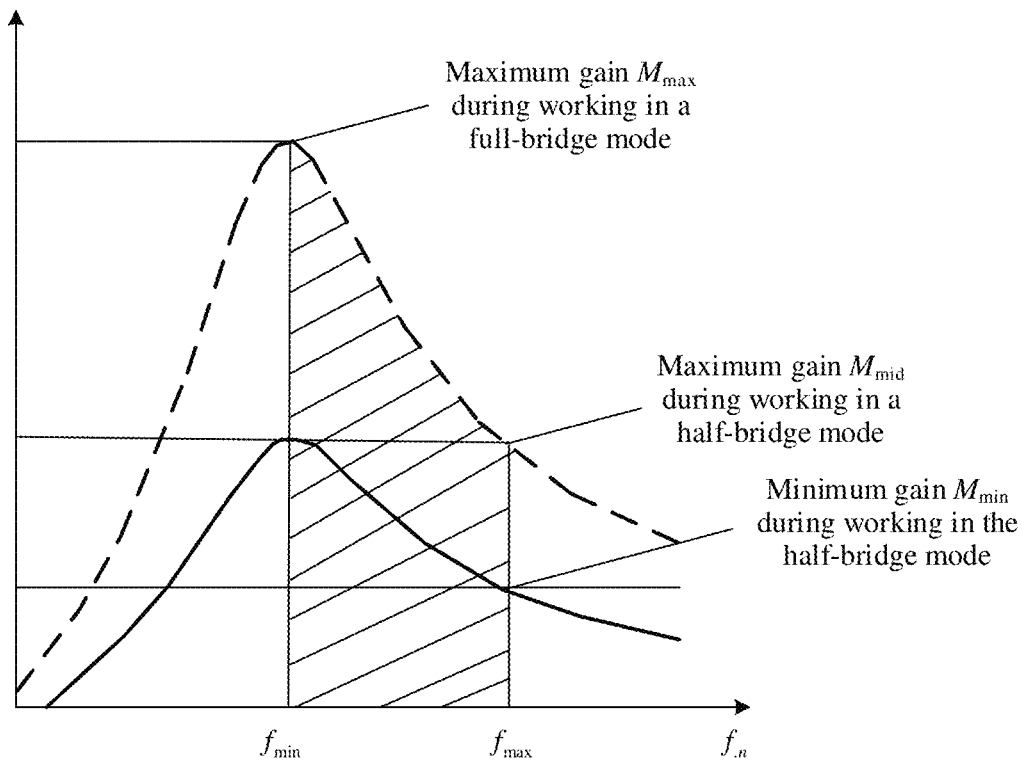
FIG. 3 is a schematic diagram of a gain curve according to an embodiment.

FIG. 2 is a schematic diagram of a structure of a resonant converter according to an embodiment. As shown in FIG. 2, the resonant converter may include an inversion circuit, an LLC resonant tank network, a transformer, and a rectification circuit. FIG. 3 is a schematic diagram of a gain curve according to an embodiment. FIG. 3 is a diagram of a gain curve existing when the resonant converter in FIG. 2 works. As shown in FIG. 3, a horizontal coordinate is a frequency of a switching transistor, and a vertical coordinate is a gain of the resonant converter. The frequency of the switching transistor changes between $f_{mid}$ and $f_{max}$. When the inversion circuit works in a half-bridge mode, the gain of the resonant converter changes between $M_{min}$ and $M_{mid}$. When the inversion circuit works in a full-bridge mode, the gain of the resonant converter changes between $M_{mid}$ and $M_{max}$. It may be understood that, when the frequency of the switching transistor changes between $f_{min}$ and $f_{max}$, and the inversion circuit works in the half-bridge mode or the full-bridge mode, the resonant converter can change only in a small gain range, and correspondingly, an output voltage can change only in a small range. To increase a change range of the output voltage, the inversion circuit may be switched between the half-bridge mode and the full-bridge mode. When the inversion circuit is switched between the half-bridge mode and the full-bridge mode for working, the gain of the resonant converter may change between $M_{min}$ and $M_{max}$, and a change range of the gain is increased, so that the change range of the output voltage can be increased. $f_{min}$ is a minimum frequency of the switching transistor, $f_{max}$ is a maximum frequency of the switching transistor, $M_{min}$ is a minimum gain of the resonant converter, $M_{mid}$ is a switching-point gain of the resonant converter, and $M_{max}$ is a maximum gain of the resonant converter. Therefore, the inversion circuit of the resonant converter is switched between the full-bridge mode and the half-bridge mode, so that the resonant converter can have a wider gain range. Therefore, the output voltage of the resonant converter can change in a wide range, so that conversion efficiency of the resonant converter can be improved when a change range of the frequency of the switching transistor is specified. However, when an input voltage is low, and the inversion circuit of the resonant converter works in the half-bridge mode, current stress of the switching transistor is large. In addition, if continuous voltage adjustment needs to be performed for the circuit, a half-bridge LLC resonant tank gain needs to be at least twice a full-bridge LLC resonant tank gain, a ratio of a maximum voltage to a minimum voltage of an LLC resonant tank voltage adjustment gain is greater than 2, a resonant tank gain adjustment range is wide, and a reactive power cycle is large. Consequently, efficiency is not high.

Figure 4:
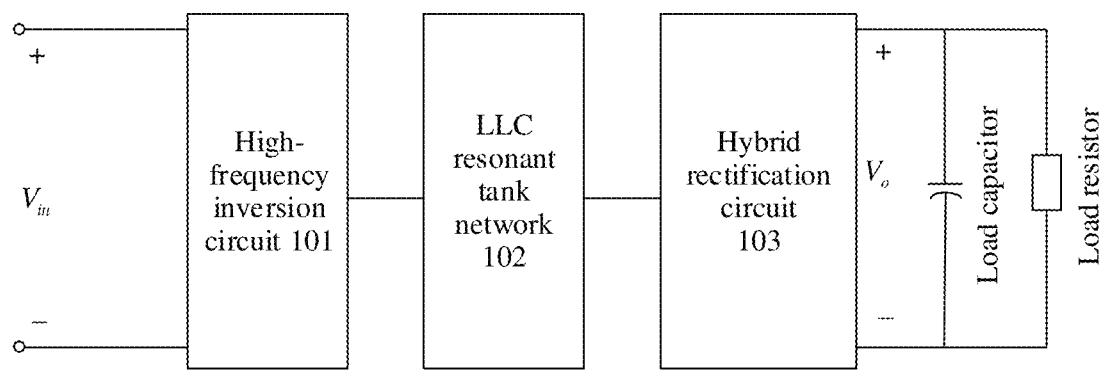
FIG. 4 is a schematic diagram of a structure of another resonant converter according to an embodiment.

FIG. 4 is a schematic diagram of a structure of another resonant converter according to an embodiment. As shown in FIG. 4, the resonant converter may include a high-frequency inversion circuit 101, an LLC resonant tank network 102, and a hybrid rectification circuit 103.

The LLC resonant tank network 102 may be separately coupled to the high-frequency inversion circuit 101 and the hybrid rectification circuit 103.

The high-frequency inversion circuit 101 is configured to convert a first direct current voltage into a first alternating current voltage.

The LLC resonant tank network 102 is configured to adjust the first alternating current voltage to obtain a second alternating current voltage.

The hybrid rectification circuit 103 works in a full-bridge rectification mode when a direct current voltage adjustment gain falls within a first threshold range, or works in a voltage doubling rectification mode when a direct current voltage adjustment gain falls within a second threshold range, to convert the second alternating current voltage into a second direct current voltage for output, where the direct current voltage adjustment gain is a ratio of the second direct current voltage to the first direct current voltage.

The first direct current voltage is a direct current voltage that is input to the resonant converter and may be denoted as $V_{in}$. An input end of the high-frequency inversion circuit 101 may be used as an input end of the resonant converter. A direct current voltage may be input by using the input end. The direct current voltage may be provided by a direct current power supply, may be provided by a rectification circuit, or may be provided by another circuit that has a same function. An output end of the hybrid rectification circuit 103 may be used as an output end of the resonant converter. An output voltage of the resonant converter may be denoted as $V_o$. The resonant converter may supply power to a load, the output end thereof may be coupled to the load, and the load may be at least one of a resistor, a capacitor, a circuit, and the like. For example, as shown in FIG. 5, the load may include a load capacitor and a load resistor.

The hybrid rectification circuit 103 may include two working modes, namely, the full-bridge rectification mode and the voltage doubling rectification mode. The working mode of the hybrid rectification circuit 103 may be switched based on the direct current voltage adjustment gain. When the direct current voltage adjustment gain falls within the first threshold range, the hybrid rectification circuit 103 may work in the full-bridge rectification mode. When the direct current voltage adjustment gain falls within the second threshold range, the hybrid rectification circuit 103 may work in the voltage doubling rectification mode. The first threshold range may be less than the second threshold range.

In an embodiment, the resonant converter may further include a voltage conversion circuit.

Figure 5:
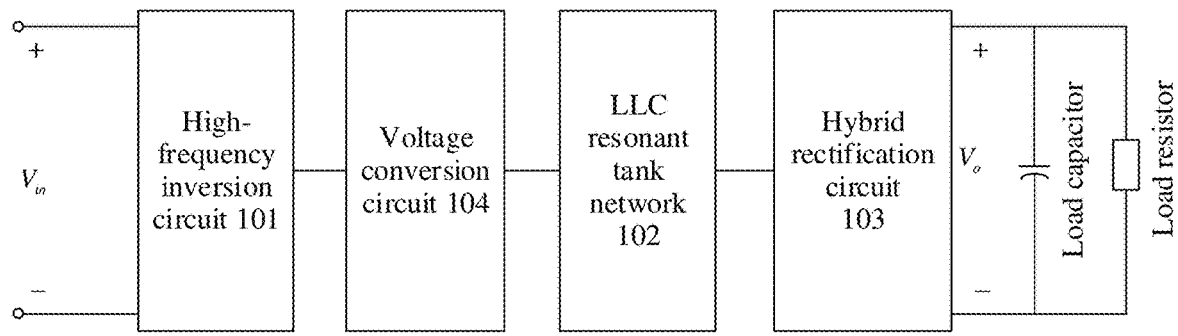
FIG. 5 is a schematic diagram of a structure of still another resonant converter according to an embodiment.

FIG. 5 is a schematic diagram of a structure of still another resonant converter according to an embodiment. As shown in FIG. 5, in an implementation, the voltage conversion circuit 104 may be separately coupled to the high-frequency inversion circuit 101 and the LLC resonant tank network 102. The voltage conversion circuit 104 is configured to adjust the first alternating current voltage to obtain a third alternating current voltage. That the LLC resonant tank network adjusts the first alternating current voltage to obtain a second alternating current voltage may be that the LLC resonant tank network 102 adjusts the third alternating current voltage to obtain the second alternating current voltage.

The voltage conversion circuit 104 may be located between the high-frequency inversion circuit 101 and the LLC resonant tank network 102 and may convert an output voltage of the high-frequency inversion circuit 101 and then output the voltage to the LLC resonant tank network 102.

Figure 6:
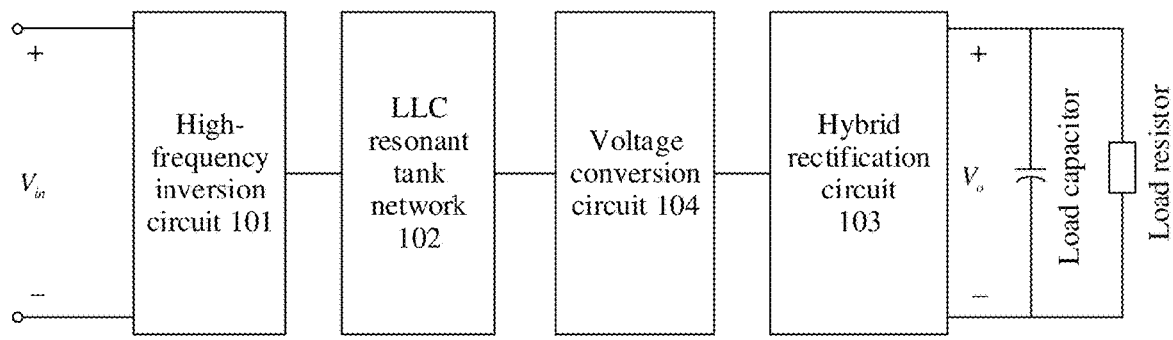
FIG. 6 is a schematic diagram of a structure of still another resonant converter according to an embodiment.

FIG. 6 is a schematic diagram of a structure of still another resonant converter according to an embodiment. As shown in FIG. 6, in another implementation, the voltage conversion circuit 104 may be separately coupled to the LLC resonant tank network 102 and the hybrid rectification circuit 103. The voltage conversion circuit 104 is configured to adjust the second alternating current voltage to obtain a fourth alternating current voltage. That the hybrid rectification circuit 103 works in a full-bridge rectification mode when a direct current voltage adjustment gain falls within a first threshold range, or works in a voltage doubling rectification mode when a direct current voltage adjustment gain falls within a second threshold range, to convert the second alternating current voltage into a second direct current voltage for output may be as follows: The hybrid rectification circuit 103 works in the full-bridge rectification mode when the direct current voltage adjustment gain falls within the first threshold range, or works in the voltage doubling rectification mode when the direct current voltage adjustment gain falls within the second threshold range, to convert the fourth alternating current voltage into the second direct current voltage for output.

The voltage conversion circuit 104 may be located between the LLC resonant tank network 102 and the hybrid rectification circuit 103 and may convert an output voltage of the LLC resonant tank network 102 and then output the voltage to the hybrid rectification circuit 103.

Figure 7:
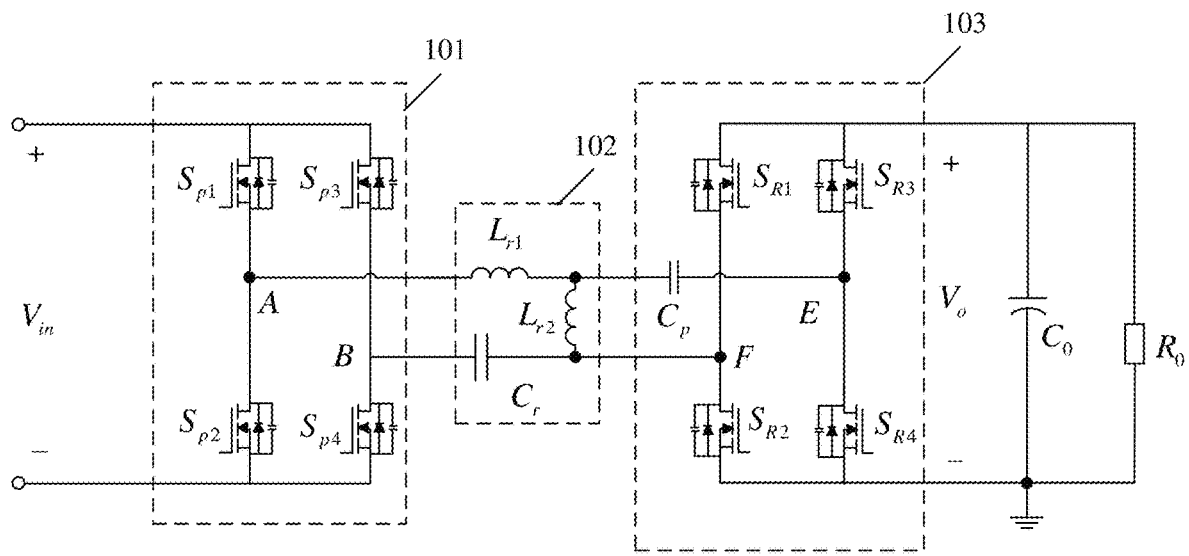
FIG. 7 is a schematic diagram of a structure of still another resonant converter according to an embodiment.

FIG. 7 is a schematic diagram of a structure of still another resonant converter according to an embodiment. The resonant converter shown in FIG. 7 is obtained by optimizing the resonant converter shown in FIG. 4.

The high-frequency inversion circuit 101 may include a first switching transistor $S_{p1}$, a second switching transistor $S_{p2}$, a third switching transistor $S_{p3}$, and a fourth switching transistor $S_{p4}$. A drain of $S_{p1}$ and a source of $S_{p2}$ are used as the input end of the resonant converter. The drain of $S_{p1}$ is coupled to a drain of $S_{p3}$. A source of $S_{p1}$ is separately coupled to a drain of $S_{p2}$ and a first input end of the voltage conversion circuit 104. A source of $S_{p3}$ is separately coupled to a drain of $S_{p4}$ and a second input end of the voltage conversion circuit 104. The source of $S_{p2}$ is coupled to a source of $S_{p4}$. The high-frequency inversion circuit 101 shown in FIG. 7 is a full-bridge inversion circuit. In addition, the high-frequency inversion circuit 101 may be a half-bridge inversion circuit, a three-level inversion circuit, or another inversion circuit that has a same function. A detailed structure is not described herein.

In an embodiment, the LLC resonant tank network 102 may include a first inductor $L_{r1}$, a second inductor $L_{r2}$, and a first capacitor $C_r$. In an implementation, a first end of $L_{r1}$ and a first end of $C_r$ are respectively coupled to two output ends of the high-frequency inversion circuit 101, a second end of $L_{r1}$ and a second end of $C_r$ are respectively coupled to two ends of $L_{r2}$, and the two ends of $L_{r2}$ are respectively coupled to two input ends of the hybrid rectification circuit 103. In another implementation, a first end of $L_{r1}$ and a first end of $L_{r2}$ are respectively coupled to two output ends of the high-frequency inversion circuit 101, a second end of $L_{r1}$ and a second end of $L_{r2}$ are respectively coupled to two ends of $C_r$, and two ends of $L_{r2}$ are respectively coupled to two input ends of the hybrid rectification circuit 103. In still another implementation, a first end of $C_r$ and a first end of $L_{r2}$ are respectively coupled to two output ends of the high-frequency inversion circuit 101, a second end of $C_r$ and a second end of $L_{r2}$ are respectively coupled to two ends of $L_{r1}$ and two ends of $L_{r2}$ are respectively coupled to two input ends of the hybrid rectification circuit 103.

The hybrid rectification circuit 103 may include a second capacitor $C_p$ and a rectifier bridge.

A first input end of the rectifier bridge is coupled to a first end of $C_p$, a second end of $C_p$ is coupled to a first output end of the LLC resonant tank network 102, a second input end of the rectifier bridge is coupled to a second output end of the LLC resonant tank network 102, and two output ends of the rectifier bridge are used as the output end of the resonant converter.

Figure 8:
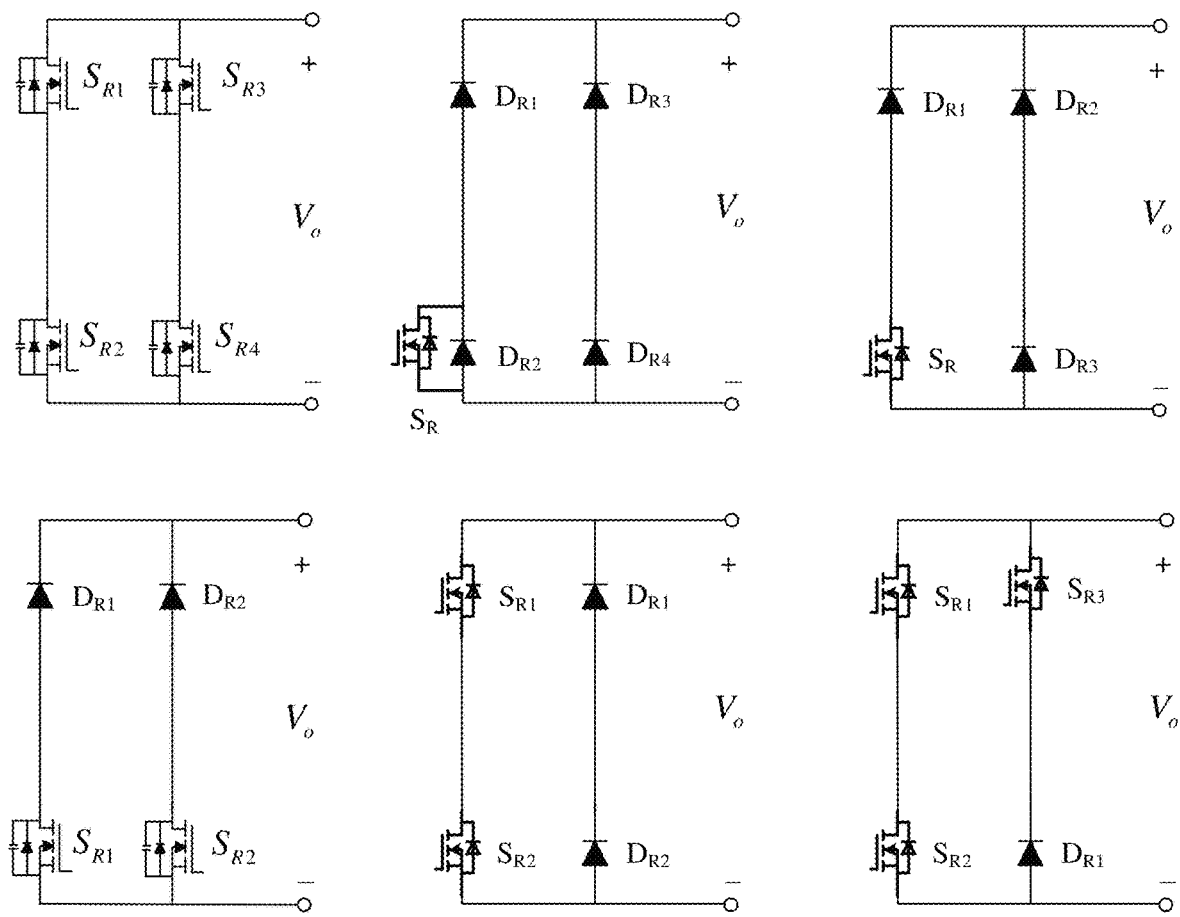
FIG. 8 is a schematic diagram of a structure of a rectifier bridge according to an embodiment.

FIG. 8 is a schematic diagram of a structure of a rectifier bridge according to an embodiment. As shown in FIG. 8, the rectifier bridge may include a plurality of switching transistors. In an embodiment, the rectifier bridge may include four switching transistors. The rectifier bridge may also include at least one diode and at least one switch transistor. In an embodiment, the rectifier bridge may include four diodes and one switching transistor, and the switching transistor may be connected in parallel with any diode. For example, a switching transistor $S_R$ may be connected in parallel with a diode $D_{R2}$. In another embodiment, the rectifier bridge may include three diodes and one switching transistor. In still another embodiment, the rectifier bridge may include two diodes and two switching transistors. In still another embodiment, the rectifier bridge may include one diode and three switching transistors. The diode may be a parasitic diode of a switching transistor.

In an implementation, as shown in FIG. 8, the rectifier bridge may include a fifth switching transistor $S_{R1}$, a sixth switching transistor $S_{R2}$, a seventh switching transistor $S_{R3}$, and an eighth switching transistor $S_{R4}$. A drain of $S_{R1}$ is coupled to a drain of $S_{R3}$. A source of $S_{R1}$ is separately coupled to the second output end of the LLC resonant tank network 102 and a drain of $S_{R2}$. A source of $S_{R2}$ is coupled to a source of $S_{R4}$. A source of $S_{R3}$ is separately coupled to the second end of $C_p$ and a drain of $S_{R4}$. The drain of $S_{R3}$ and the source of $S_{R4}$ are used as the output end of the resonant converter.

When the load includes a load capacitor $C_o$ and a load resistor $R_o$, as shown in FIG. 8, a first end of $C_o$ may be separately coupled to a first output end of the hybrid rectification circuit 103 and a first end of the load resistor $R_o$, and a second end of $C_o$, a second output end of the hybrid rectification circuit 103, and a second end of $R_o$ are separately used to connect to a ground terminal.

Figure 9:
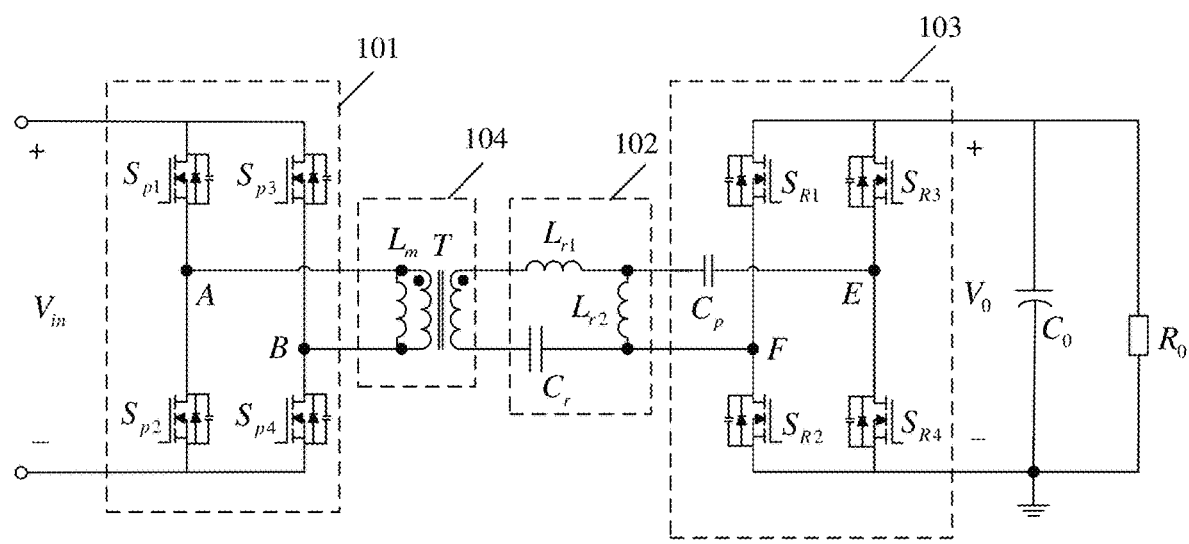
FIG. 9 is a schematic diagram of a structure of still another resonant converter according to an embodiment.

FIG. 9 is a schematic diagram of a structure of still another resonant converter according to an embodiment. The resonant converter shown in FIG. 9 is obtained by optimizing the resonant converter shown in FIG. 5. As shown in FIG. 9, the voltage conversion circuit 104 may include a third inductor $L_m$ and a transformer T.

Two ends of $L_m$ are respectively coupled to two output ends of the high-frequency inversion circuit 101, the two ends of $L_m$ are respectively coupled to two ends of a primary side of T, and two ends of a secondary side of T are respectively coupled to two input ends of the LLC resonant tank network 102.

T may be a center tap transformer or may be a common single-output winding transformer. Current directions of the primary side and the secondary side of T are the same.

Figure 10:
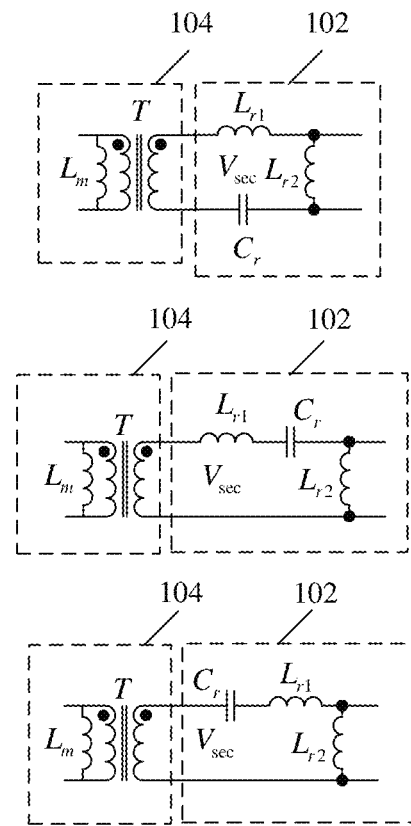
FIG. 10 is a schematic diagram of a structure of coupling an LLC resonant tank network to a voltage conversion circuit according to an embodiment.

FIG. 10 is a schematic diagram of a structure of coupling an LLC resonant tank network to a voltage conversion circuit according to an embodiment. As shown in FIG. 10, in three implementations, the two input ends of the LLC resonant tank network 102 are coupled to two output ends of the voltage conversion circuit 104. For a coupling manner, refer to descriptions in FIG. 8. Details are not described herein again.

A gain of the resonant converter is $M_{total}=V_o/V_{in}=M_{SP}*N_{SP}*M_{LLC}*M_{SR}$ where $M_{SP}$ is a gain of the high-frequency inversion circuit 101, $N_{SP}$ is a transformer ratio of the voltage conversion circuit 104, $M_{LLC}$ is a gain of the LLC resonant tank network 102, and $M_{SR}$ is a gain of the hybrid rectification circuit 103. $N_{SP}$ is a fixed value and cannot be adjusted, but $M_{SP}$, $M_{LLC}$ and $M_{SR}$ can be adjusted. In the following specification, $M_{LLC}$ is adjusted after it is assumed that $M_{SP}$ and $M_{SR}$ are fixed values. A value of $M_{SP}$ varies with a structure of the $M_{SP}$ high-frequency inversion circuit 101. For example, if the high-frequency inversion circuit 101 is a half-bridge high-frequency inversion circuit, $M_{SP}=0.5$. If the high-frequency inversion circuit 101 is a full bridge high frequency inversion circuit, $M_{SP}=1$. A value of $M_{SR}$ varies with a working mode of the hybrid rectification circuit 103. For example, if the hybrid rectification circuit 103 works in the full-bridge rectification mode, $M_{SR}=1$. If the hybrid rectification circuit 103 works in the voltage doubling rectification mode, $M_{SR}=2$ The resonant converter may adjust a frequency of a switching transistor to change a value of $M_{LLC}$, so that $V_o$ in case of different $V_{in}$ can be obtained.

Figure 11:
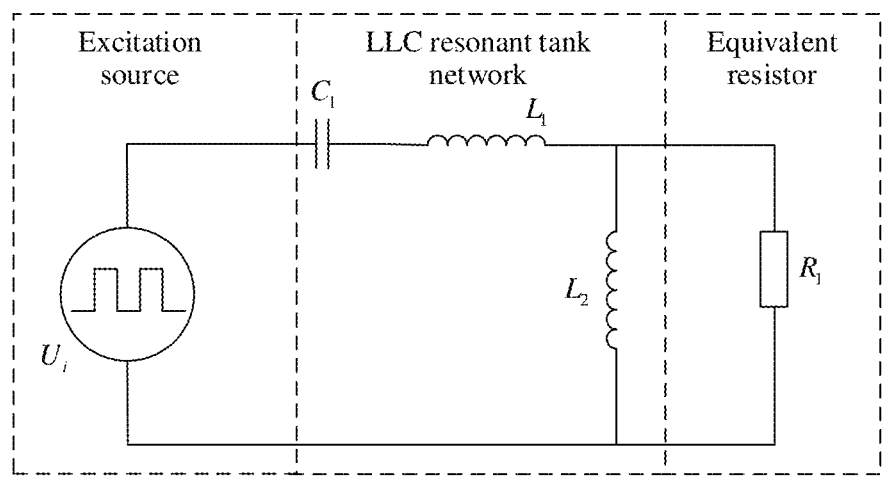
FIG. 11 is a diagram of a working principle of a resonant converter according to an embodiment.

FIG. 11 is a diagram of a working principle of a resonant converter according to an embodiment. As shown in FIG. 11, different from a conventional soft switch technology, the LLC resonant converter may adjust the output voltage of the resonant converter by changing a working frequency of a pulse input into the LLC resonant tank network through pulse frequency modulation (PFM). $V_{in}$ and the high-frequency inversion circuit 101 may be combined to be jointly simplified as an excitation source $U_i$ of the LLC resonant tank network in FIG. 11. The voltage conversion circuit 104, the hybrid rectification circuit 103, the load capacitor, and the load resistor may be combined to be equivalent to an equivalent resistor $R_1$ in FIG. 11. The LLC resonant tank network 102 is equivalent to an LLC resonant tank network in FIG. 11.

The equivalent circuit may be deduced and calculated by using a fundamental component analysis (FHA) method. It may be understood from a working feature of the resonant circuit that a series resonance frequency of a resonant inductor $L_1$ and a resonant capacitor $C_1$ is $$f_r = \frac{1}{2\pi\sqrt{L_1 C_1}},$$

and an output equivalent resistance of the LLC resonant tank network is obtained as $$R_{ac} = \frac{\pi^2}{8} R_1$$

according to Ohm's law.

When the hybrid rectification circuit 103 works in the full-bridge rectification mode, the equivalent resistance is $$R_{1\_full} = \frac{V_o^2}{P_o}.$$

An expression of $M_{LLC}$ is as follows:

$$M_{LLC\_full} = \frac{1}{\sqrt{\left[1 + \lambda - \frac{\lambda}{\left(\frac{f_s}{f_r}\right)^2}\right]^2 + Q_{full}^2 \left(\frac{f_s}{f_r} - \frac{f_r}{f_s}\right)^2}}$$

where $f_r = \frac{1}{2\pi\sqrt{L_1 C_1}}$, a quality factor is $$Q_{full} = \frac{Z_1}{R_{ac}}, \text{ and } Z_1 = \sqrt{\frac{L_1}{C_1}}.$$

When the hybrid rectification circuit 103 works in the voltage doubling rectification mode, the equivalent resistance is $$R_{1\_double} = \frac{\left(\frac{V_o}{2}\right)^2}{P_o} = \frac{R_{1\_full}}{4}.$$

An expression of $M_{LLC}$ is as follows:

$$M_{LLC\_double} = \frac{1}{\sqrt{\left[1 + \lambda - \frac{\lambda}{\left(\frac{f_s}{f_r}\right)^2}\right]^2 + (Q_{double})^2 \left(\frac{f_s}{f_r} - \frac{f_r}{f_s}\right)^2}}$$

where $\lambda = \frac{L_1}{L_2}$, $f_r = \frac{1}{2\pi\sqrt{L_1 C_1}}$, a quality factor is $$Q_{double} = 4 Q_{full}, \text{ and } Z_1 = \sqrt{\frac{L_1}{C_1}}.$$

In an embodiment, a gain range of the resonant converter may be adjusted in a range of 1-2. An example in which the high-frequency inversion circuit 101 is a full-bridge high-frequency inversion circuit and the hybrid rectification circuit 103 is a circuit that includes a second capacitor and a rectifier bridge that includes four switching transistors is used for detailed description.

Figure 12:
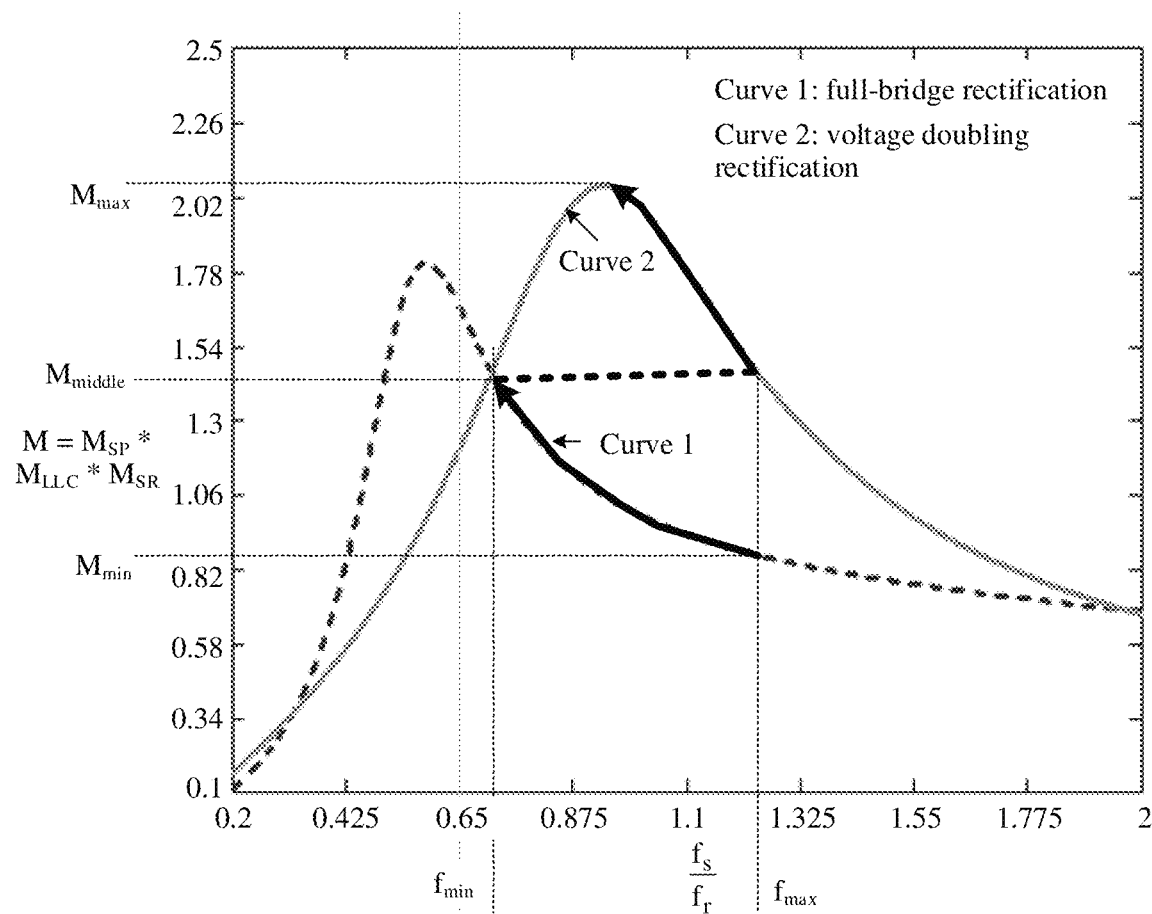
FIG. 12 is a schematic diagram of another gain curve according to an embodiment.

FIG. 12 is a schematic diagram of another gain curve according to an embodiment. As shown in FIG. 12, in the figure, a horizontal coordinate is a normalized frequency $f_s/f_r$ of a switching transistor, and a vertical coordinate is a gain of the resonant converter, where $$f_{min} = \frac{f_{s\_min}}{f_{r\_min}}$$

represents a minimum normalized frequency of the switching transistor, and $$f_{max} = \frac{f_{s\_max}}{f_{r\_max}}$$

represents a maximum normalized frequency of the switching transistor. A curve 1 is an adjustable gain curve existing when the high-frequency inversion circuit 101 works in a full-bridge high-frequency inversion mode and the hybrid rectification circuit 103 works in the full-bridge rectification mode. A curve 2 is an adjustable gain curve existing when the high-frequency inversion circuit 101 works in a full-bridge high-frequency inversion mode and the hybrid rectification circuit 103 works in the voltage doubling rectification mode. It may be understood from FIG. 12 that, when the hybrid rectification circuit 103 works in the full-bridge rectification mode, the gain of the resonant converter changes between $M_{min}$, and $M_{middle}$; and when the hybrid rectification circuit 103 works in the voltage doubling rectification mode, the gain of the resonant converter changes between $M_{middle}$ and $M_{max}$.

In an embodiment, when an adjustment range of the output voltage of the resonant converter is continuous, that is, when the gain range of the resonant converter changes in a range of $M_{min}$-$M_{middle}$-$M_{max}$, $M_{middle}$ is selected in a common adjustable area between the curve 1 and the curve 2. Shapes and relative locations of the curve 1 and the curve 2 in FIG. 12 can be adjusted by designing a circuit parameter.

Figure 13:
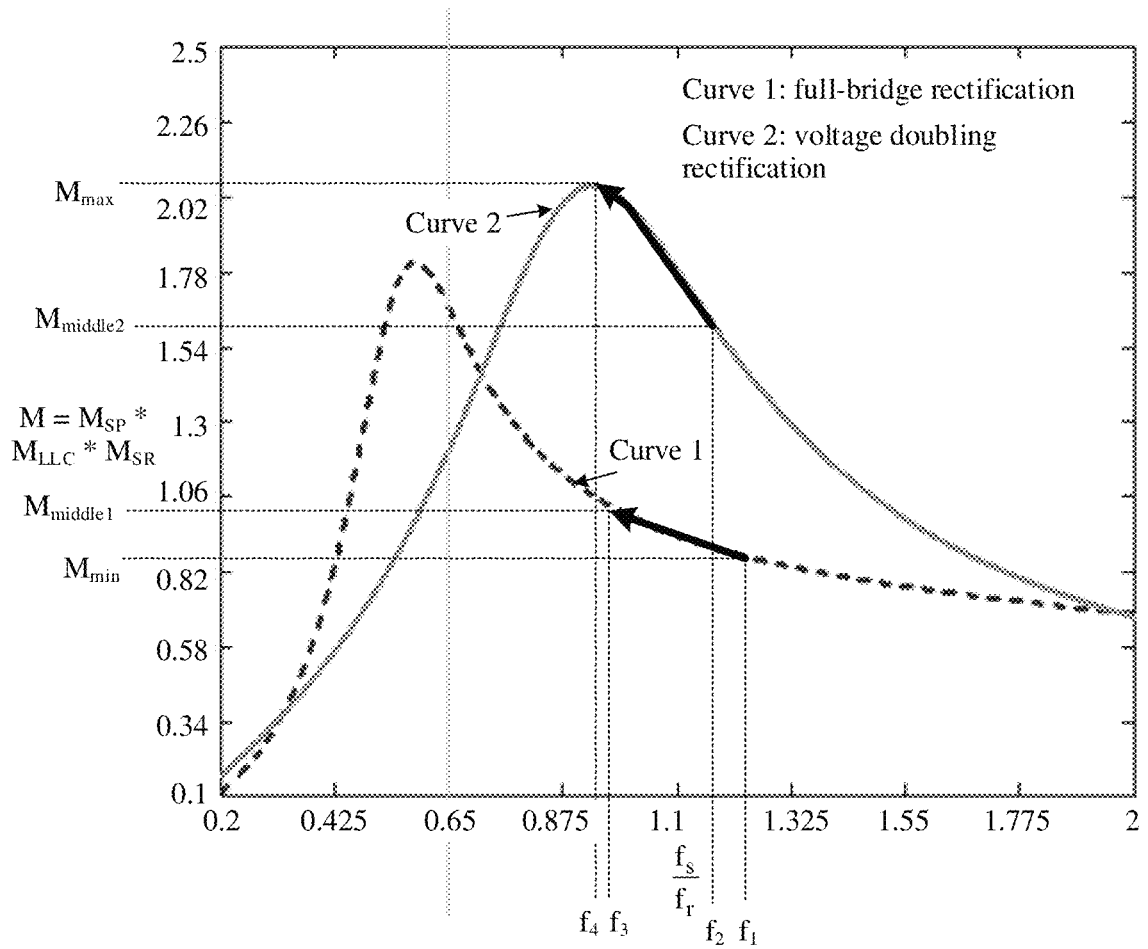
FIG. 13 is a schematic diagram of still another gain curve according to an embodiment.

In another embodiment, FIG. 13 is a schematic diagram of still another gain curve according to an embodiment. As shown in FIG. 13, when an adjustment range of the output voltage of the resonant converter is segmented, that is, when the gain range of the resonant converter changes in a range of $M_{min}$-$M_{middle1}$ and in a range of $M_{middle2}$-$M_{max}$, where $M_{middle1}$ and $M_{middle2}$ are different critical-point gains, $M_{middle1}$ and $M_{middle2}$ are selected in different adjustable areas of the curve 1 and the curve 2. Shapes and relative locations of the curve 1 and the curve 2 in FIG. 13 can be adjusted by designing a circuit parameter.

In this embodiment, when the direct current voltage adjustment gain falls within the first threshold range ($M_{min}$-$M_{middle}$ in FIG. 12 or $M_{min}$-$M_{middle1}$ in FIG. 13), the hybrid rectification circuit 103 may work in the full-bridge rectification mode to convert the second alternating current voltage into the second direct current voltage for output. When the direct current voltage adjustment gain falls within the second threshold range ($M_{middle}$-$M_{max}$ in FIG. 12 or $M_{middle2}$-$M_{max}$ in FIG. 13), the hybrid rectification circuit 103 may work in the voltage doubling rectification mode to convert the second alternating current voltage into the second direct current voltage for output.

Figure 14A:
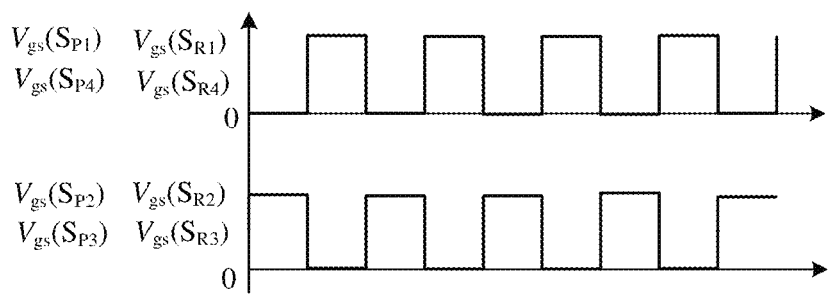
FIG. 14A is a schematic diagram of a waveform according to an embodiment.

When the direct current voltage adjustment gain falls within the first threshold range, the gain of the high-frequency inversion circuit 101 is $M_{SP}=1$, the gain $M_{LLC}$ of the LLC resonant tank network 102 may vary with the frequency f of the switching transistor, and the gain of the hybrid rectification circuit 103 is $M_{SR}=1$. FIG. 14A is a schematic diagram of a waveform according to an embodiment. As shown in FIG. 14A, in this working state, drive signals of $S_{p1}$, $S_{R1}$, $S_{p4}$, and $S_{R4}$ are in a same phase, drive signals of $S_{p2}$, $S_{R2}$, $S_{p3}$, and $S_{R4}$ are in a same phase, and phases of drive signals of $S_p$, and $S_{p2}$ are complementary to each other.

When the direct current voltage adjustment gain falls within the second threshold range, one of the switching transistors of the rectifier bridge is always turned off, and another switching transistor of a same bridge arm is always turned on, so that the hybrid rectification circuit 103 can be switched from the full-bridge rectification mode to the voltage doubling rectification mode for working.

Figure 14B:
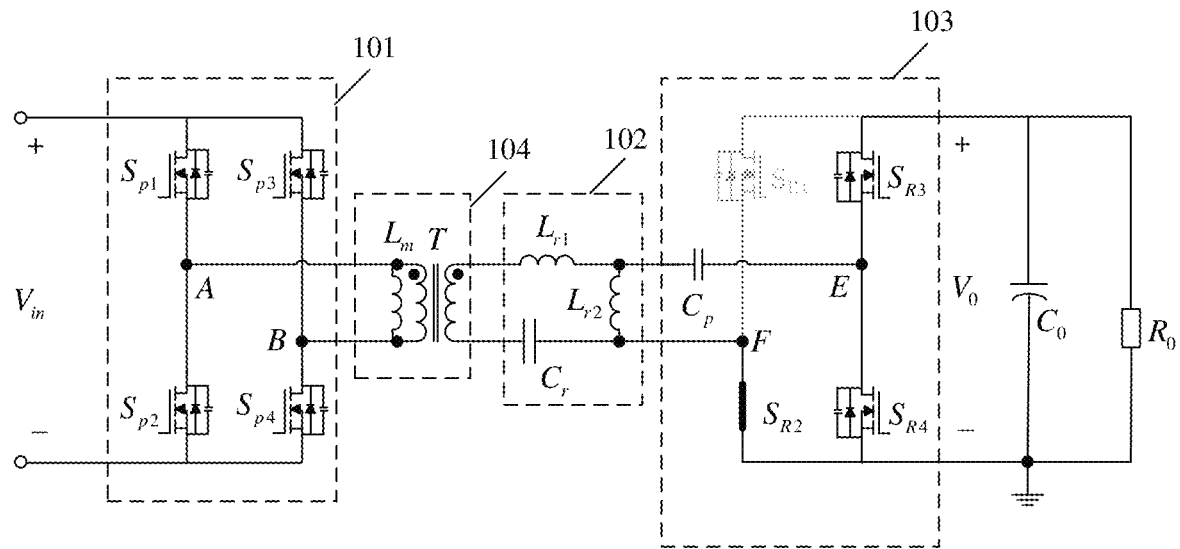
FIG. 14B is a schematic diagram of a structure of still another resonant converter according to an embodiment.
Figure 14C:
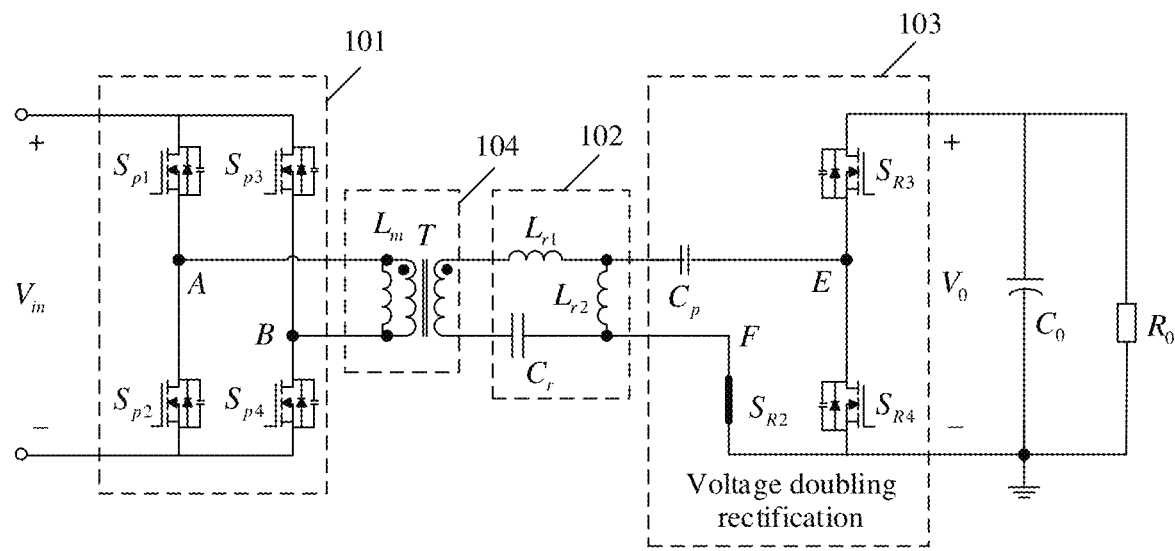
FIG. 14C is a schematic diagram of a structure of still another resonant converter according to an embodiment.
Figure 14D:
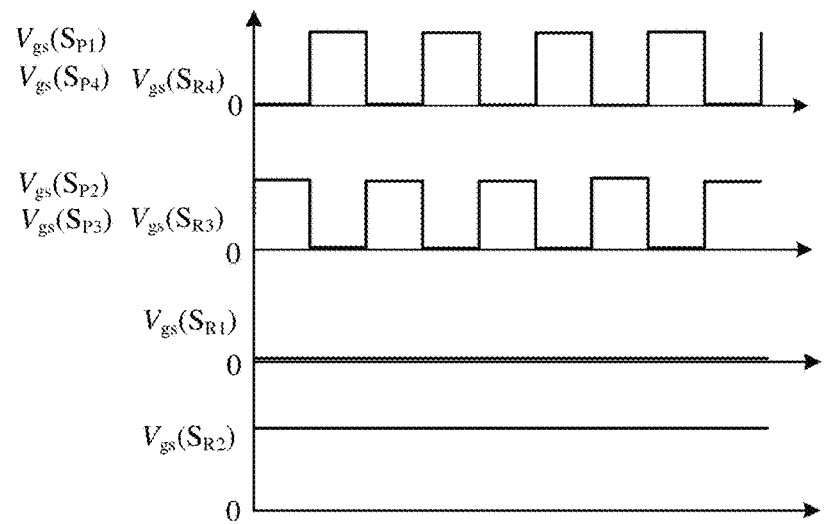
FIG. 14D is a schematic diagram of another waveform according to an embodiment.

In a first implementation, FIG. 14B is a schematic diagram of a structure of still another resonant converter according to an embodiment. As shown in FIG. 14B, $S_{R1}$ is always turned off, and $S_{R2}$ is always turned on, so that the schematic diagram of the structure of the resonant converter shown in FIG. 14C can be obtained. In this case, the hybrid rectification circuit 103 works in the voltage doubling rectification mode, and the gain thereof is $M_{SR}=2$. FIG. 14D is a schematic diagram of another waveform according to an embodiment. As shown in FIG. 14D, in this working state, drive signals of $S_{p1}$, $S_{p4}$, and $S_{R4}$ are in a same phase, drive signals of $S_{p2}$, $S_{p3}$, and $S_{R3}$ are in a same phase, and phases of drive signals of $S_{p1}$ and $S_{p2}$ are complementary to each other.

Figure 14E:
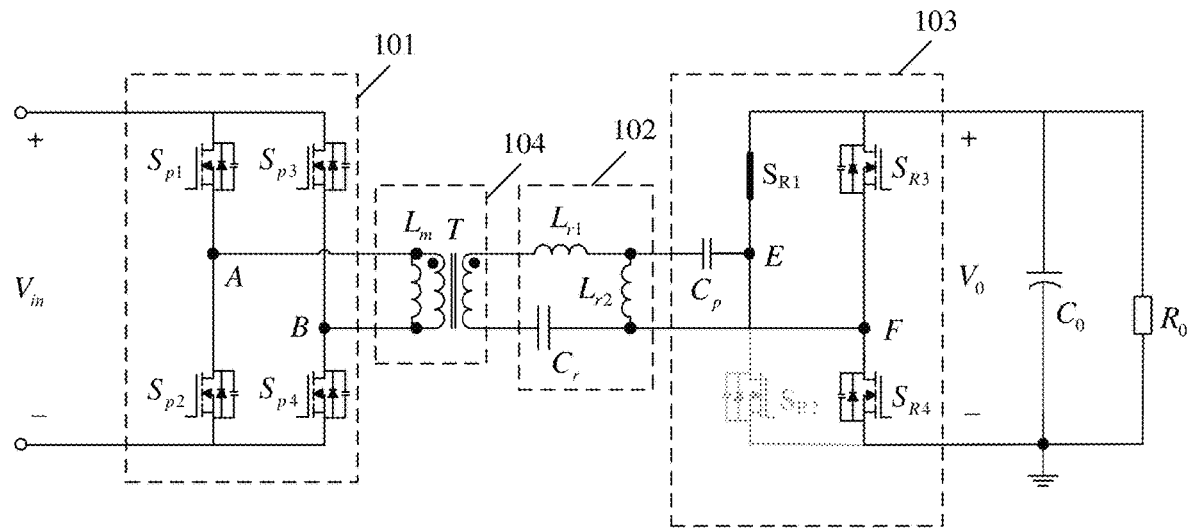
FIG. 14E is a schematic diagram of a structure of still another resonant converter according to an embodiment.
Figure 14F:
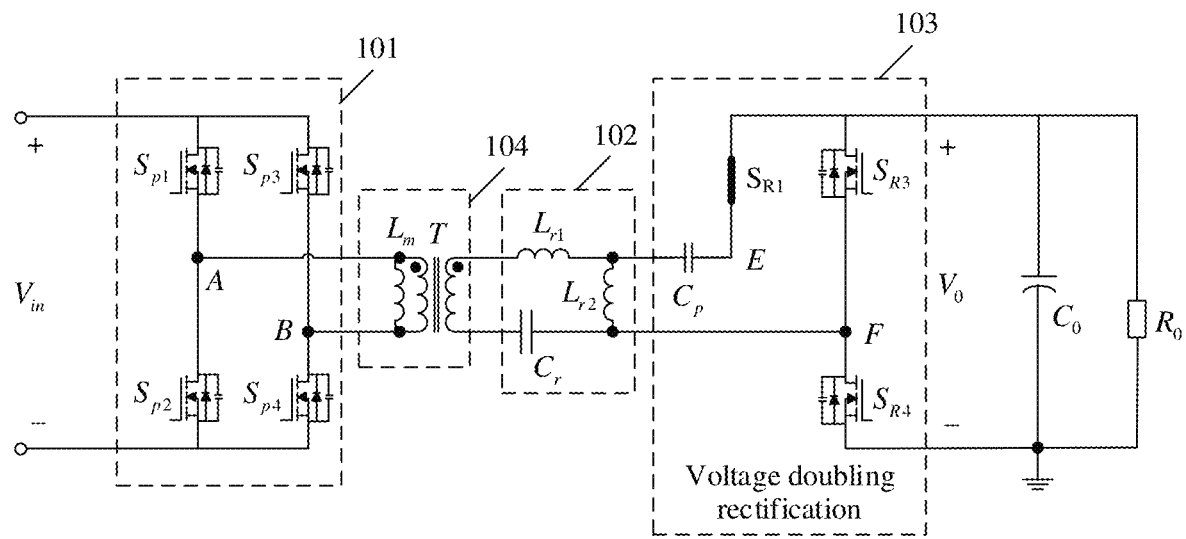
FIG. 14F is a schematic diagram of a structure of still another resonant converter according to an embodiment.
Figure 14G:
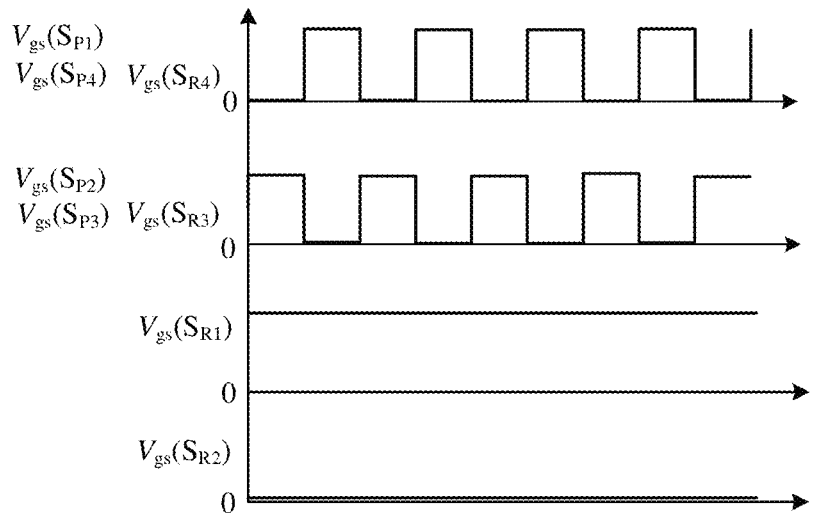
FIG. 14G is a schematic diagram of still another waveform according to an embodiment.

In a second implementation, FIG. 14E is a schematic diagram of a structure of still another resonant converter according to an embodiment. As shown in FIG. 14E, $S_{R2}$ is always turned off, and $S_{R1}$ is always turned on, so that the schematic diagram of the structure of the resonant converter shown in FIG. 14F can be obtained. In this case, the hybrid rectification circuit 103 works in the voltage doubling rectification mode, and the gain thereof is $M_{SR}=2$. FIG. 14G is a schematic diagram of still another waveform according to an embodiment. As shown in FIG. 14G, in this working state, drive signals of $S_{p1}$, $S_{p4}$, and $S_{R4}$ are in a same phase, drive signals of $S_{p2}$, $S_{p3}$, and $S_{R3}$ are in a same phase, and phases of drive signals of $S_{p1}$ and $S_{p2}$ are complementary to each other.

In implementation, the high-frequency inversion circuit 101 of the resonant converter may be a full-bridge high-frequency inversion circuit. When the direct current voltage adjustment gain falls within the first threshold range, the hybrid rectification circuit 103 may work in the full-bridge rectification mode. When the direct current voltage adjustment gain falls within the second threshold range, one of the switching transistors of the rectifier bridge is always turned off, and another switching transistor of a same bridge arm is always turned on, so that the hybrid rectification circuit 103 can be switched from the full-bridge rectification mode to the voltage doubling rectification mode for working. The hybrid rectification circuit 103 is switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

Figure 15A:
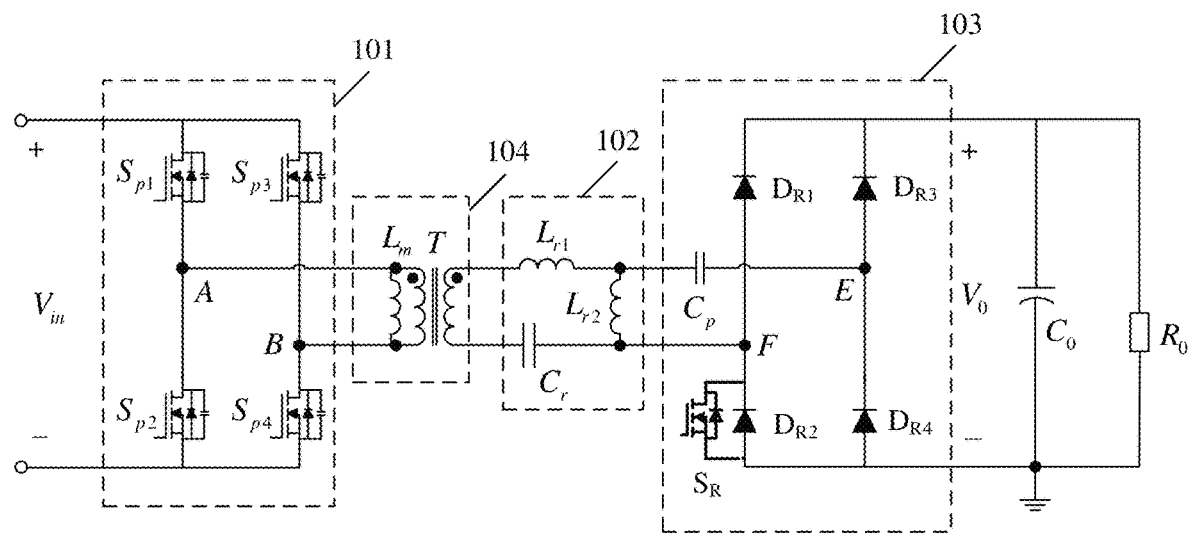
FIG. 15A is a schematic diagram of a structure of still another resonant converter according to an embodiment.

In another implementation, FIG. 15A is a schematic diagram of a structure of still another resonant converter according to an embodiment. As shown in FIG. 15A, the rectifier bridge may include a first diode $D_{R1}$, a second diode $D_{R2}$, a third diode $D_{R3}$, a fourth diode $D_{R4}$, and one switching transistor $S_R$. A negative electrode of $D_{R1}$ is coupled to a negative electrode of $D_{R3}$. A positive electrode of $D_{R1}$ is separately coupled to the second output end of the LLC resonant tank network 102, a negative electrode of $D_{R2}$, and a drain of $S_R$. A positive electrode of $D_{R2}$ is separately coupled to a source of $S_R$ and a positive electrode of $D_{R4}$. A positive electrode of $D_{R3}$ is separately coupled to the second end of $C_p$ and a negative electrode of $D_{R4}$. The negative electrode of $D_{R3}$ and the positive electrode of $D_{R4}$ are used as the output end of the resonant converter.

In an embodiment, a gain range of the resonant converter may be adjusted in a range of 1-2. An example in which the high-frequency inversion circuit is a full-bridge high-frequency inversion circuit and the rectifier bridge of the hybrid rectification circuit is a circuit that includes four diodes and one switching transistor is used for detailed description.

In this embodiment, when the direct current voltage adjustment gain falls within the first threshold range ($M_{min}$-$M_{middle}$ in FIG. 12 or $M_{min}$-$M_{middle1}$ in FIG. 13), the hybrid rectification circuit 103 may work in the full-bridge rectification mode to convert the second alternating current voltage into the second direct current voltage for output. When the direct current voltage adjustment gain falls within the second threshold range ($M_{middle}$-$M_{max}$ in FIG. 12 or $M_{middle2}$-$M_{max}$ in FIG. 13), the hybrid rectification circuit 103 may work in the voltage doubling rectification mode to convert the second alternating current voltage into the second direct current voltage for output.

Figure 15B:
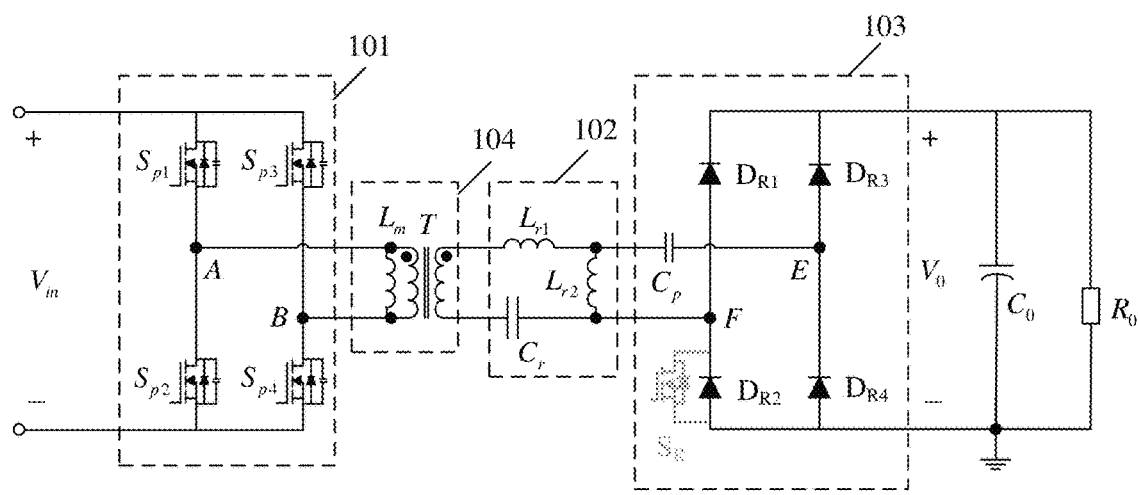
FIG. 15B is a schematic diagram of a structure of still another resonant converter according to an embodiment.

When the direct current voltage adjustment gain falls within the first threshold range, FIG. 15B is a schematic diagram of a structure of still another resonant converter according to an embodiment. As shown in FIG. 15B, the switching transistor $S_R$ is always turned off, so that the schematic diagram of the structure of the resonant converter shown in FIG. 15C can be obtained. In this case, the gain of the high-frequency inversion circuit 101 is $M_{SR}=1$, the gain $M_{LLC}$ of the LLC resonant tank network 102 may vary with the frequency f of the switching transistor, and the gain of the hybrid rectification circuit 103 is $M_{SR}=1$. FIG. 15D is a schematic diagram of still another waveform according to an embodiment. As shown in FIG. 15D, in this working state, drive signals of $S_{p1}$ and $S_{p4}$ are in a same phase, drive signals of $S_{p2}$ and $S_{p3}$ are in a same phase, and phases of drive signals of $S_{p1}$ and $S_{p2}$ are complementary to each other.

When the direct current voltage adjustment gain falls within the second threshold range, one of the diodes of the rectifier bridge is always turned off, and the switching transistor $S_R$ is always turned on, so that the hybrid rectification circuit 103 can be switched from the full-bridge rectification mode to the voltage doubling rectification mode for working.

Figure 15C:
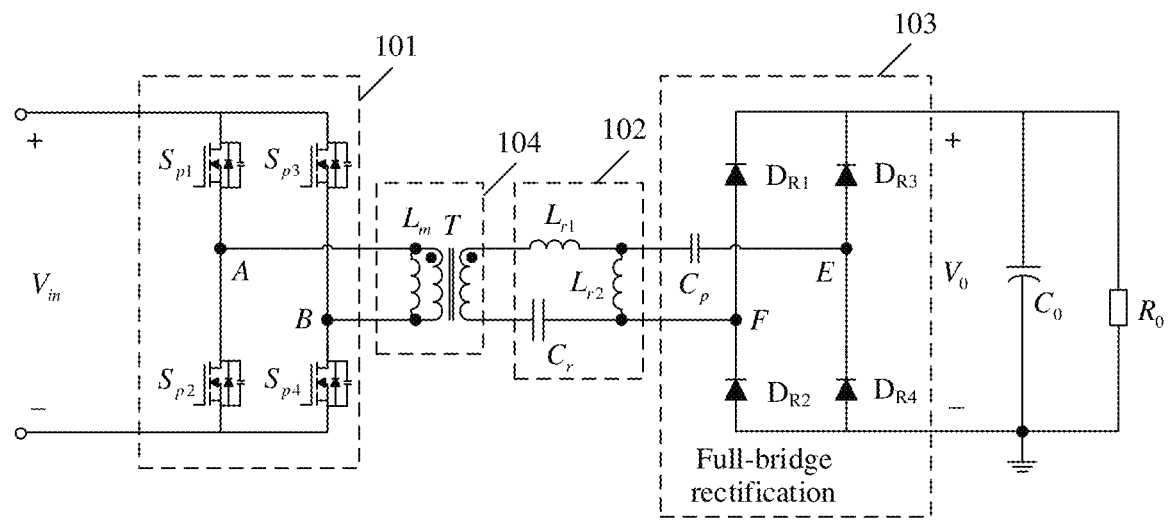
FIG. 15C is a schematic diagram of a structure of still another resonant converter according to an embodiment.
Figure 15D:
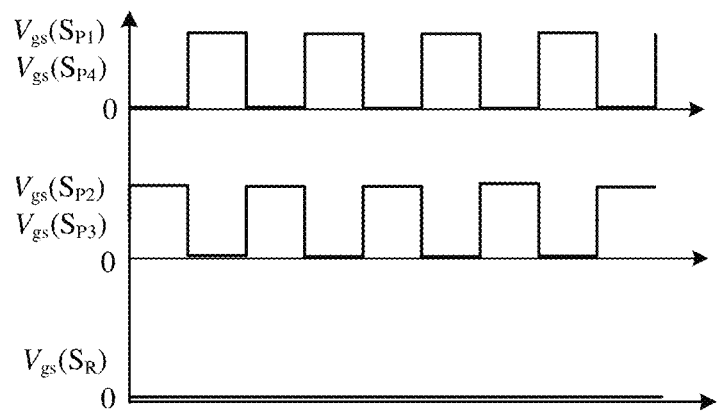
FIG. 15D is a schematic diagram of still another waveform according to an embodiment.
Figure 15E:
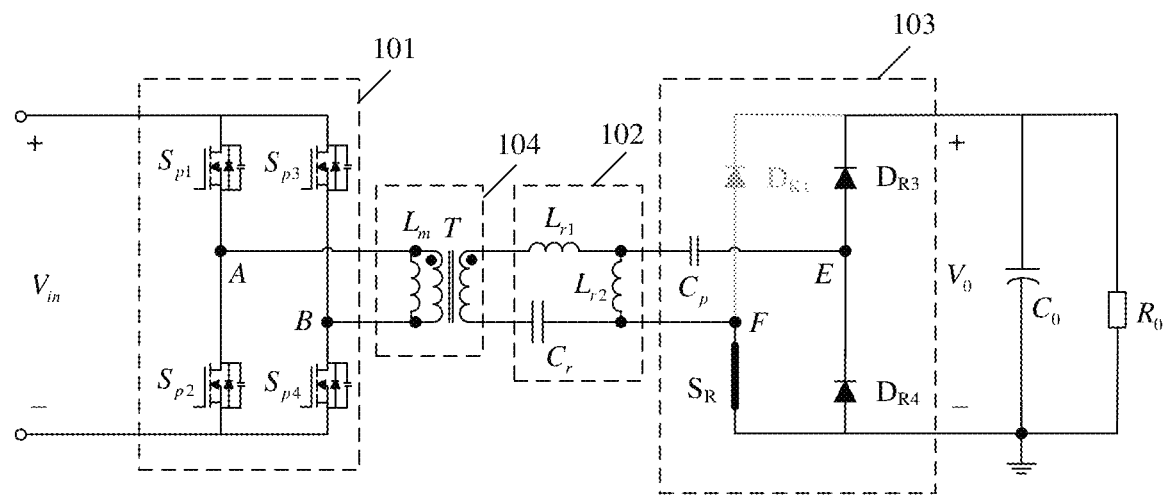
FIG. 15E is a schematic diagram of a structure of still another resonant converter according to an embodiment.

FIG. 15E is a schematic diagram of a structure of still another resonant converter according to an embodiment. As shown in FIG. 15E, $D_{R1}$ is always turned off, and $S_R$ is always turned on, so that the schematic diagram of the structure of the resonant converter shown in FIG. 15F can be obtained. In this case, the hybrid rectification circuit 103 works in the voltage doubling rectification mode, and the gain thereof is $M_{SR}$=2. FIG. 15G is a schematic diagram of still another waveform according to an embodiment. As shown in FIG. 15G, in this working state, drive signals of $S_{p1}$ and $S_{p4}$ are in a same phase, drive signals of $S_{p2}$ and $S_{p3}$ are in a same phase, and phases of drive signals of $S_{p1}$ and $S_{p2}$ are complementary to each other.

In implementation, the high-frequency inversion circuit 101 of the resonant converter may be a full-bridge high-frequency inversion circuit. When the direct current voltage adjustment gain falls within the first threshold range, the hybrid rectification circuit 103 works in the full-bridge rectification mode. When the direct current voltage adjustment gain falls within the second threshold range, one of the diodes of the rectifier bridge is always turned off, and the switching transistor is always turned on, so that the hybrid rectification circuit 103 can be switched from the full-bridge rectification mode to the voltage doubling rectification mode for working. The hybrid rectification circuit 103 is switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

In an embodiment, a gain range of the resonant converter may be adjusted in a range of 0.5-2. The following is described in detail.

Figure 16A:
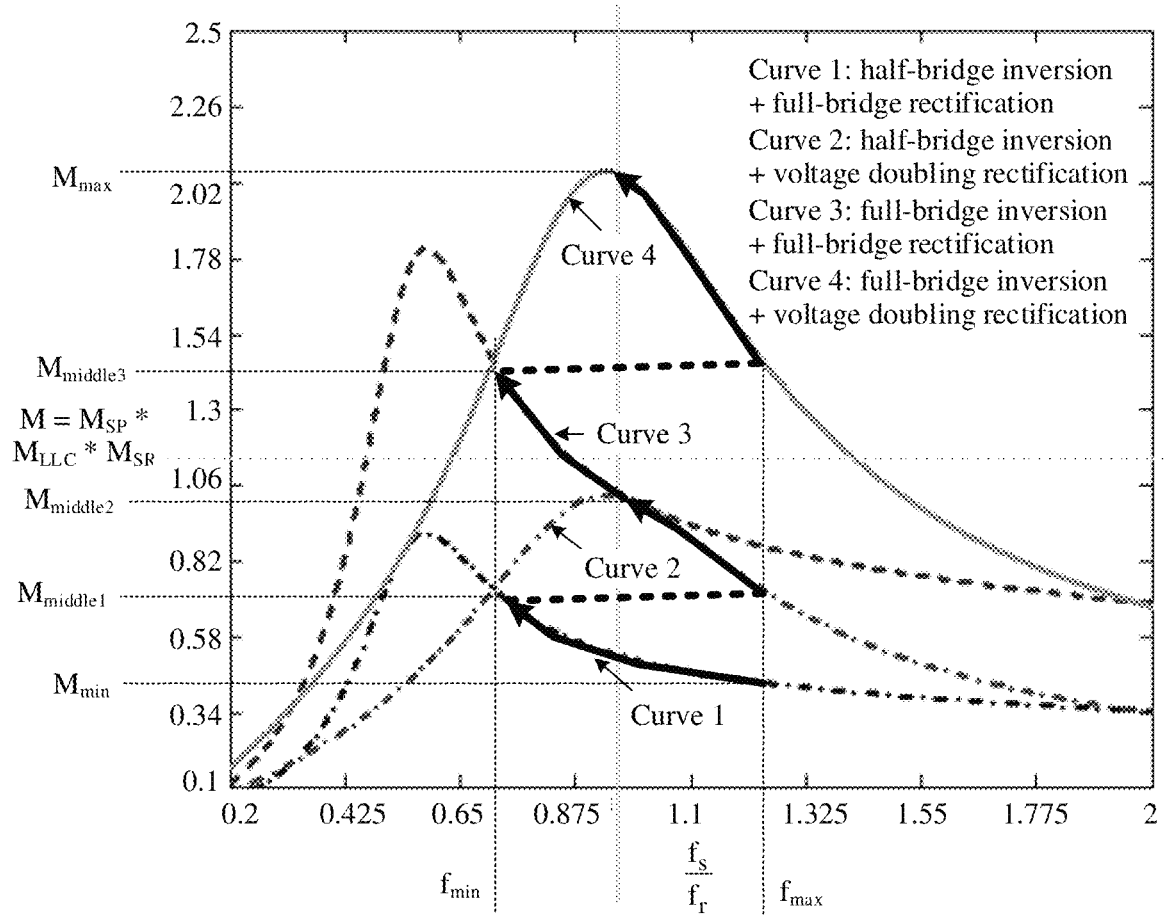
FIG. 16A is a schematic diagram of still another gain curve according to an embodiment.

FIG. 16A is a schematic diagram of still another gain curve according to an embodiment. As shown in FIG. 16A, a curve 1 is a gain curve existing when the high-frequency inversion circuit 101 works in a half-bridge inversion mode and the hybrid rectification circuit 103 works in the full-bridge rectification mode. A curve 2 is a gain curve existing when the high-frequency inversion circuit 101 works in a half-bridge inversion mode and the hybrid rectification circuit 103 works in the voltage doubling rectification mode. A curve 3 is a gain curve existing when the high-frequency inversion circuit 101 works in a full-bridge inversion mode and the hybrid rectification circuit 103 works in the full-bridge rectification mode. A curve 4 is a gain curve existing when the high-frequency inversion circuit 101 works in a full-bridge inversion mode and the hybrid rectification circuit 103 works in the voltage doubling rectification mode.

Figure 16B:
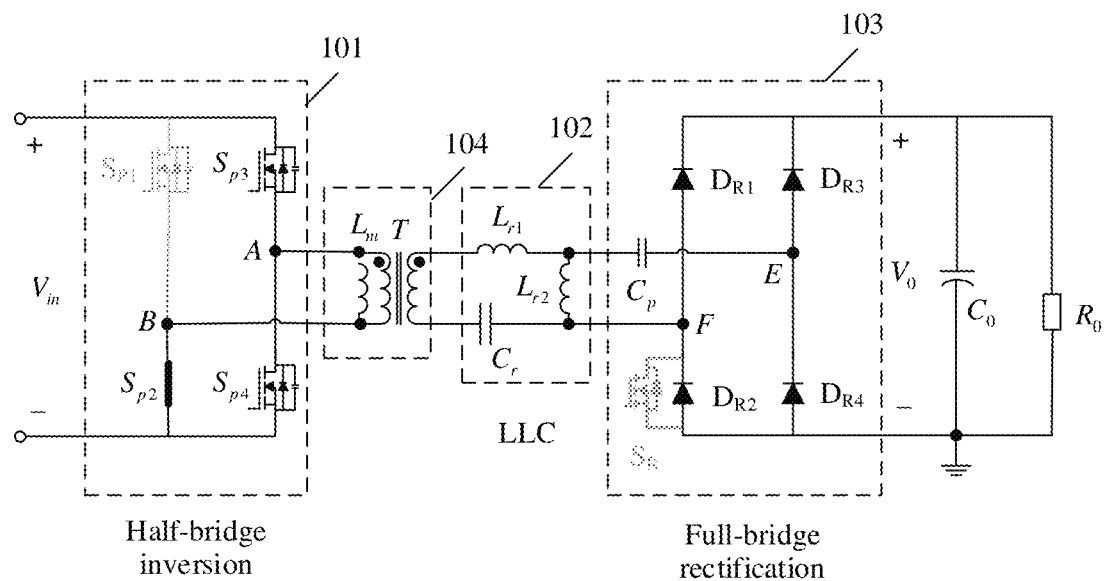
FIG. 16B is a schematic diagram of a structure of still another resonant converter according to an embodiment.
Figure 16C:
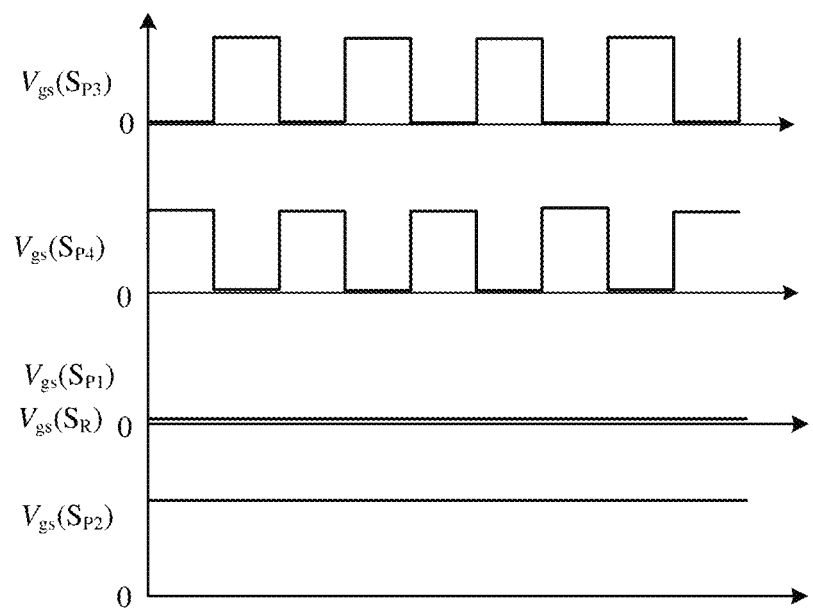
FIG. 16C is a schematic diagram of still another waveform according to an embodiment.

In this embodiment, FIG. 16B is a schematic diagram of a structure of still another resonant converter according to an embodiment. As shown in FIG. 16B, the high-frequency inversion circuit 101 is a half-bridge high-frequency inversion circuit, and a gain thereof is $M_{SP}$=0.5. The gain $M_{LLC}$ of the LLC resonant tank network 102 varies with the frequency $f_s$ of the switching transistor. When the direct current voltage adjustment gain falls within the first threshold range ($M_{min}$-$M_{middle1}$ in FIG. 16A), the hybrid rectification circuit 103 may work in the full-bridge rectification mode, and the gain thereof is $M_{SR}$=1. FIG. 16C is a schematic diagram of still another waveform according to an embodiment. As shown in FIG. 16C, in this working state, phases of drive signals of $S_{p3}$ and $S_{p4}$ are complementary to each other, and drive signals of $S_{p1}$ and $S_R$ are in a same phase.

Figure 16D:
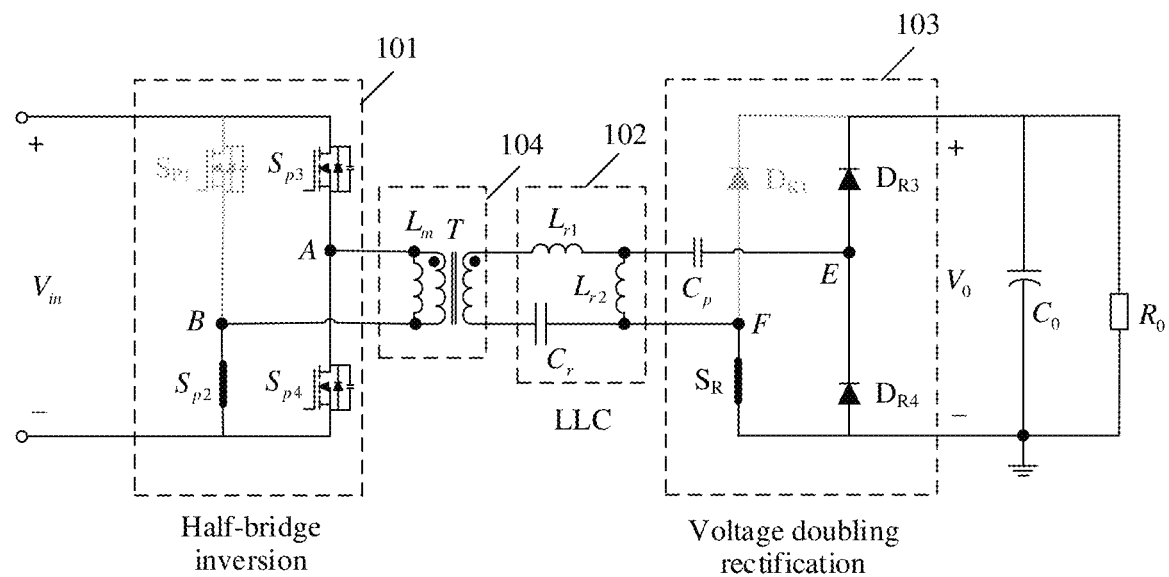
FIG. 16D is a schematic diagram of a structure of still another resonant converter according to an embodiment.
Figure 16E:
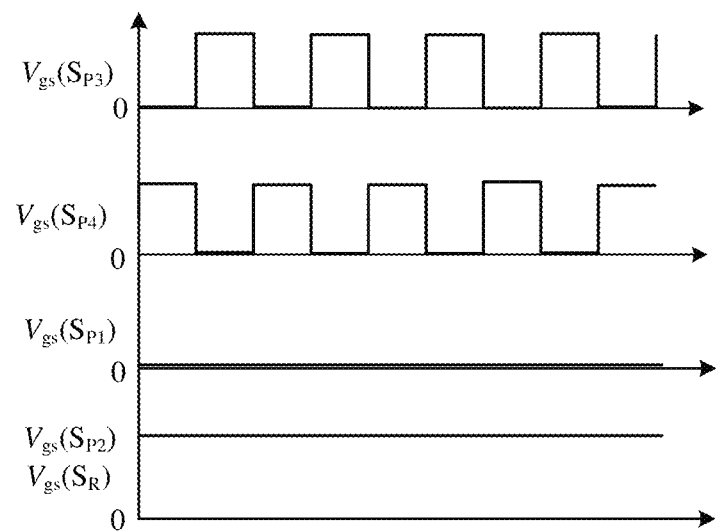
FIG. 16E is a schematic diagram of still another waveform according to an embodiment.

FIG. 16D is a schematic diagram of a structure of still another resonant converter according to an embodiment. As shown in FIG. 16D, when the direct current voltage adjustment gain falls within the second threshold range ($M_{middle1}$-$M_{middle2}$ in FIG. 16A), the hybrid rectification circuit 103 may work in the voltage doubling rectification mode, and the gain thereof is $M_{SR=2}$. FIG. 16E is a schematic diagram of still another waveform according to an embodiment. As shown in FIG. 16E, in this working state, phases of drive signals of $S_{p3}$ and $S_{p4}$ are complementary to each other, and drive signals of $S_{p2}$ and $S_R$ are in a same phase.

Figure 16F:
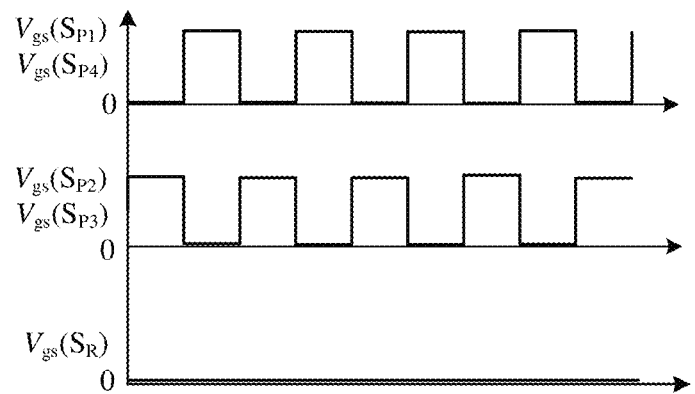
FIG. 16F is a schematic diagram of still another waveform according to an embodiment.

As shown in FIG. 15C, the high-frequency inversion circuit 101 is a full-bridge high-frequency inversion circuit, and a gain thereof is $M_{SP}$, =1. The gain $M_{LLC}$ of the LLC resonant tank network 102 varies with the frequency $f_s$ of the switching transistor. When the direct current voltage adjustment gain falls within the first threshold range ($M_{middle2}$-$M_{middle3}$ in FIG. 16A), the hybrid rectification circuit 103 may work in the full-bridge rectification mode, and the gain thereof is $M_{SR}$=1. FIG. 16F is a schematic diagram of still another waveform according to an embodiment. As shown in FIG. 16F, in this working state, drive signals of $S_{p1}$ and $S_{p4}$ are in a same phase, drive signals of $S_{p2}$ and $S_{p3}$ are in a same phase, and phases of drive signals of $S_{p1}$ and $S_{p2}$ are complementary to each other.

Figure 15F:
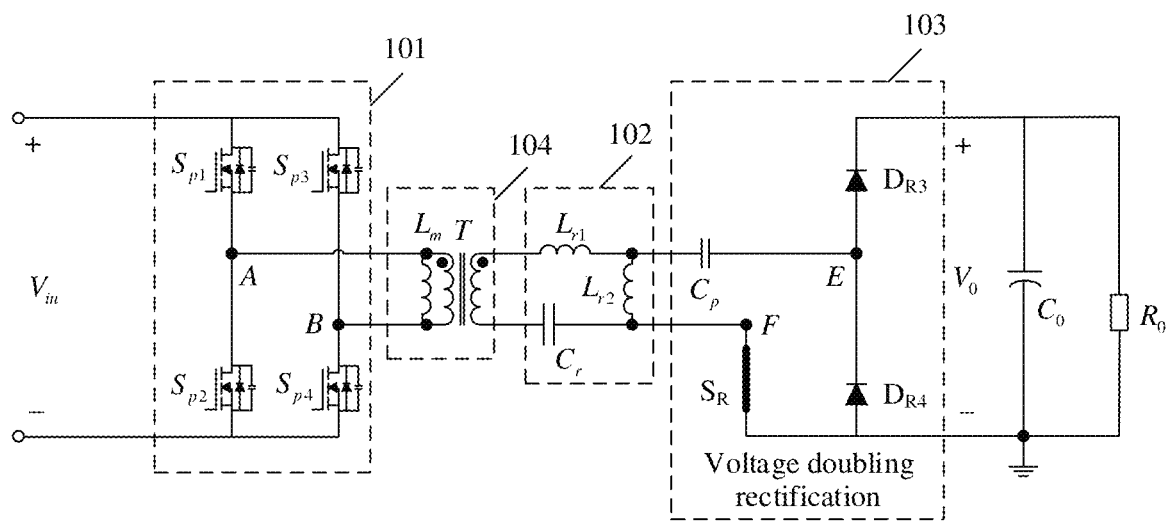
FIG. 15F is a schematic diagram of a structure of still another resonant converter according to an embodiment.
Figure 15G:
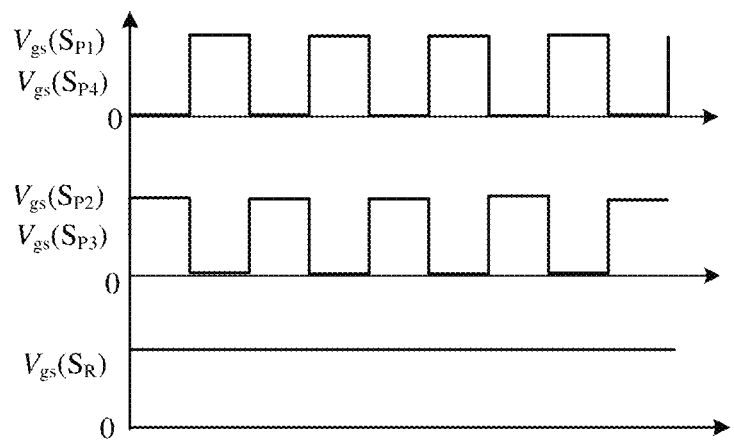
FIG. 15G is a schematic diagram of still another waveform according to an embodiment.
Figure 16G:
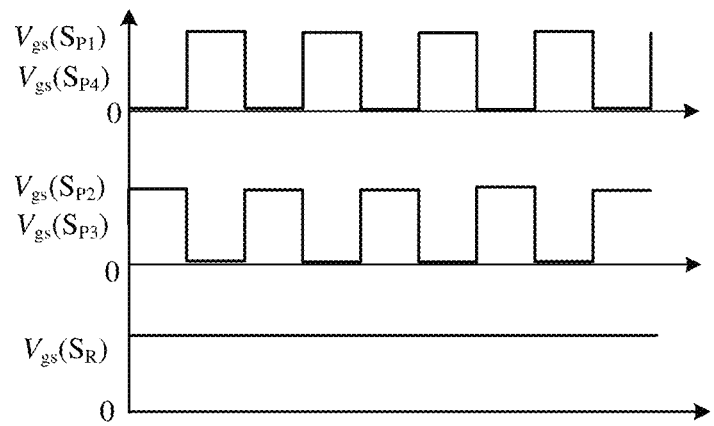
FIG. 16G is a schematic diagram of still another waveform according to an embodiment.

As shown in FIG. 15F, when the direct current voltage adjustment gain falls within the second threshold range ($M_{middle3}$-$M_{max}$ in FIG. 16A), the hybrid rectification circuit 103 may work in the voltage doubling rectification mode, and the gain thereof is $M_{SR}$=2. FIG. 16G is a schematic diagram of still another waveform according to an embodiment. As shown in FIG. 16G, in this working state, drive signals of $S_p$, and $S_{p4}$ are in a same phase, drive signals of $S_{p2}$ and $S_{p3}$ are in a same phase, and phases of drive signals of $S_{p1}$ and $S_{p2}$ are complementary to each other.

Figure 17:
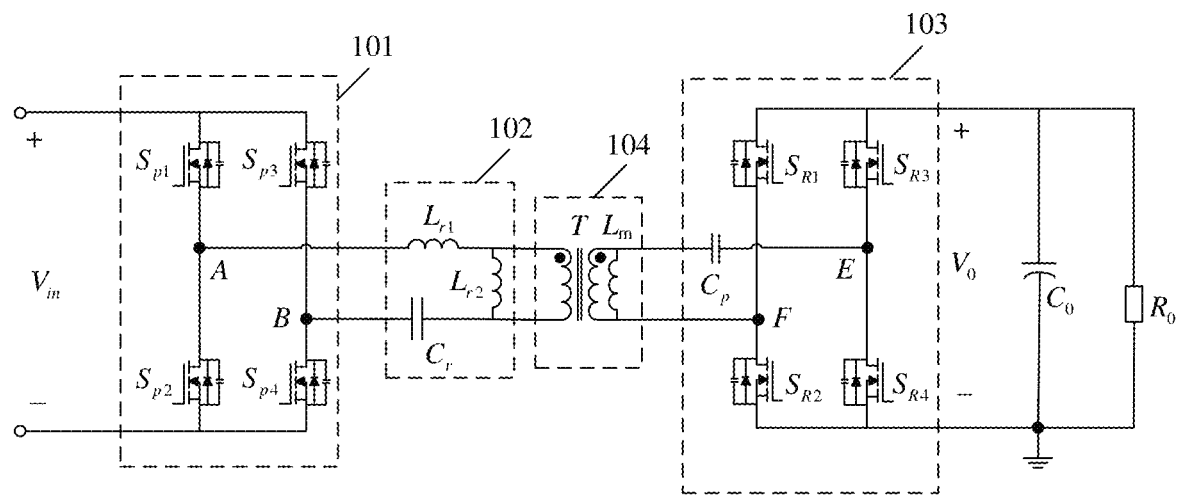
FIG. 17 is a schematic diagram of a structure of still another resonant converter according to an embodiment.

FIG. 17 is a schematic diagram of a structure of still another resonant converter according to an embodiment. FIG. 17 is obtained by optimizing the resonant converter shown in FIG. 6.

In another embodiment, the voltage conversion circuit 104 is shown in FIG. 17. Two ends of a primary side of T are respectively coupled to two output ends of the LLC resonant tank network 102, two ends of $L_m$ are respectively connected to two ends of a secondary side of T, and the two ends of $L_m$ are respectively coupled to two input ends of the hybrid rectification circuit 103.

Figure 18:
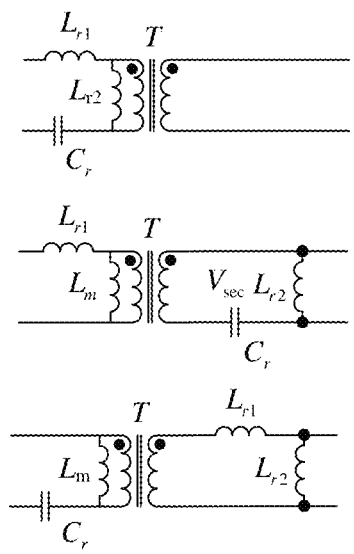
FIG. 18 is a schematic diagram of a structure of another LLC resonant tank network according to an embodiment.

In another embodiment, FIG. 18 is a schematic diagram of a structure of coupling an LLC resonant tank network to a voltage conversion circuit according to an embodiment. As shown in FIG. 18, in an implementation, a first end of $L_{r1}$ is coupled to a first output end of the high-frequency inversion circuit 101. A first end of $C_r$ is coupled to a second output end of the high-frequency inversion circuit 101. A second end of $L_{r1}$ is coupled to a first end of $L_{r2}$. A second end of $C_r$ is coupled to a second end of $L_{r2}$. The first end of $L_{r2}$ is coupled to a first input end of the voltage conversion circuit 104. The second end of $L_{r2}$ is coupled to a second input end of the voltage conversion circuit 104. In another implementation, a first end of $L_{r1}$ is coupled to a first output end of the high-frequency inversion circuit 101. A second end of $L_{r1}$ is coupled to a first input end of the voltage conversion circuit 104. A second output end of the high-frequency inversion circuit 101 is coupled to a second input end of the voltage conversion circuit 104. A first end of $L_{r2}$ is separately coupled to a first output end of the voltage conversion circuit 104 and a first input end of the hybrid rectification circuit 103. A first end of $C_r$ is coupled to a second output end of the voltage conversion circuit 104. The second end of $L_{r2}$ is separately coupled to a second end of $C_r$ and a second input end of the hybrid rectification circuit 103. In still another implementation, a first input end of the voltage conversion circuit 104 is coupled to a first output end of the inversion circuit 101. A first end of $C_r$ is coupled to a second output end of the high-frequency inversion circuit 101. A second end of $C_r$ is coupled to a second input end of the voltage conversion circuit 104. A first end of $L_{r1}$ is coupled to a first output end of the voltage conversion circuit 104. A second end of $L_{r1}$ is separately coupled to a first end of $L_{r2}$ and a first input end of the hybrid rectification circuit 103. A second end of $L_{r2}$ is separately coupled to a second output end of the voltage conversion circuit 104 and a second input end of the hybrid rectification circuit 103.

In implementation, the hybrid rectification circuit 103 of the resonant converter may be switched between the full-bridge rectification working mode and the voltage doubling rectification working mode, so that the resonant converter has a wider gain range in a same switching frequency range, to reduce a reactive power cycle loss, so as to implement high conversion efficiency during wide input-output voltage power conversion.

It should be noted that the switching transistor provided in this embodiment may be an insulated gate bipolar transistor (IGBT), a metal-oxide semiconductor field-effect transistor (MOSFET, a transistor, or the like. This is not limited.

Figure 19:
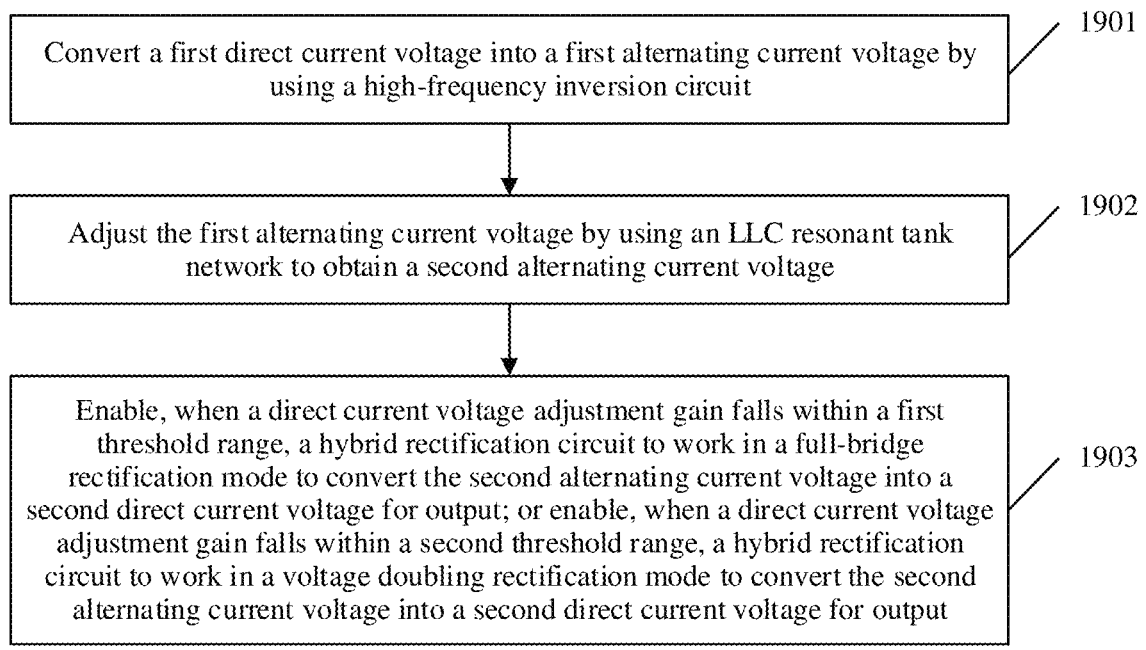
FIG. 19 is a schematic flowchart of a voltage conversion method according to an embodiment.

FIG. 19 is a schematic flowchart of a voltage conversion method according to an embodiment. The voltage conversion method is applied to a resonant converter. As shown in FIG. 4, the resonant converter may include a high-frequency inversion circuit, an LLC resonant tank network, and a hybrid rectification circuit. As shown in FIG. 19, the voltage conversion method may include the following steps:

1901. Convert a first direct current voltage into a first alternating current voltage by using the high-frequency inversion circuit.

1902. Adjust the first alternating current voltage by using the LLC resonant tank network to obtain a second alternating current voltage.

1903. Enable, when a direct current voltage adjustment gain falls within a first threshold range, the hybrid rectification circuit to work in a full-bridge rectification mode to convert the second alternating current voltage into a second direct current voltage for output; or enable, when a direct current voltage adjustment gain falls within a second threshold range, a hybrid rectification circuit to work in a voltage doubling rectification mode to convert the second alternating current voltage into a second direct current voltage for output.

The resonant converter may further include a voltage conversion circuit. In an embodiment, the method may further include: adjusting the first alternating current voltage by using the voltage conversion circuit to obtain a third alternating current voltage. The adjusting the first alternating current voltage by using the LLC resonant tank network to obtain a second alternating current voltage includes: adjusting the third alternating current voltage by using the LLC resonant tank network to obtain the second alternating current voltage. The method corresponds to the resonant converter shown in FIG. 5.

In another embodiment, the method may further include: adjusting the second alternating current voltage by using the voltage conversion circuit to obtain a fourth alternating current voltage. The enabling, when a direct current voltage adjustment gain falls within a first threshold range, the hybrid rectification circuit to work in a full-bridge rectification mode to convert the second alternating current voltage into a second direct current voltage for output includes:

enabling, when the direct current voltage adjustment gain falls within the first threshold range, the hybrid rectification circuit to work in the full-bridge rectification mode to convert the fourth alternating current voltage into the second direct current voltage.

The enabling, when a direct current voltage adjustment gain falls within a second threshold range, the hybrid rectification circuit to work in a voltage doubling rectification mode to convert the second alternating current voltage into a second direct current voltage for output includes:

enabling, when the direct current voltage adjustment gain falls within the second threshold range, the hybrid rectification circuit to work in the voltage doubling rectification mode to convert the fourth alternating current voltage into the second direct current voltage for output. The method corresponds to the resonant converter shown in FIG. 6.

For detailed descriptions of each step in the foregoing method, refer to the foregoing related descriptions. Details are not described herein again.

The objectives, solutions, and benefits are further described in detail in the foregoing embodiments. It should be understood that the foregoing descriptions are merely implementations, but are not intended to limit the scope of the embodiments. Any modification, equivalent replacement, or improvement shall fall within the scope of the embodiments.

What is claimed is:

1. A resonant converter, comprising:
a high-frequency inversion circuit;
an inductor-inductor-capacitor (LLC) resonant tank network; and
a hybrid rectification circuit, wherein the LLC resonant tank network is separately coupled to the high-frequency inversion circuit and the hybrid rectification circuit, the high-frequency inversion circuit is configured to convert a first direct current voltage into a first alternating current voltage, the LLC resonant tank network is configured to adjust the first alternating current voltage to obtain a second alternating current voltage;
a voltage conversion circuit, separately coupled to the high-frequency inversion circuit and the LLC resonant tank network, wherein the voltage conversion circuit comprises a transformer and a third inductor, two ends of the third inductor are respectively coupled to two ends of a primary side of the transformer, and
the hybrid rectification circuit works in a full-bridge rectification mode when a direct current voltage adjustment gain falls within a first threshold range, or works in a voltage doubling rectification mode when the direct current voltage adjustment gain falls within a second threshold range, to convert the second alternating current voltage into a second direct current voltage for output, wherein the direct current voltage adjustment gain is a ratio of the second direct current voltage to the first direct current voltage.

2. The resonant converter according to claim 1, wherein the voltage conversion circuit is configured to adjust the first alternating current voltage to obtain a third alternating current voltage, and the adjusting, by the LLC resonant tank network, the first alternating current voltage to obtain the second alternating current voltage further comprises:
adjusting, by the LLC resonant tank network, the third alternating current voltage to obtain the second alternating current voltage.

3. The resonant converter according to claim 1, further comprising:
a voltage conversion circuit, wherein the voltage conversion circuit is separately coupled to the LLC resonant tank network and the hybrid rectification circuit, the voltage conversion circuit is configured to adjust the second alternating current voltage to obtain a fourth alternating current voltage, the hybrid rectification circuit
works in the full-bridge rectification mode when the direct current voltage adjustment gain falls within the first threshold range, or
works in the voltage doubling rectification mode when the direct current voltage adjustment gain falls within the second threshold range, to convert the second alternating current voltage into the second direct current voltage for output, and the hybrid rectification circuit
works in the full-bridge rectification mode when the direct current voltage adjustment gain falls within the first threshold range, or
works in the voltage doubling rectification mode when the direct current voltage adjustment gain falls within the second threshold range, to convert the fourth alternating current voltage into the second direct current voltage for output.

4. The resonant converter according to claim 1, wherein the high-frequency inversion circuit is a three-level inversion circuit.

5. The resonant converter according to claim 1, wherein the LLC resonant tank network comprises a first capacitor, a first inductor, and a second inductor.

6. The resonant converter according to claim 5, wherein a first end of the first inductor and a first end of the first capacitor are respectively coupled to two output ends of the high-frequency inversion circuit, a second end of the first inductor and a second end of the first capacitor are respectively coupled to two ends of the second inductor, and the two ends of the second inductor are respectively coupled to two input ends of the hybrid rectification circuit;
a first end of the first inductor and a first end of the second inductor are respectively coupled to two output ends of the high-frequency inversion circuit, a second end of the first inductor and a second end of the second inductor are respectively coupled to two ends of the first capacitor, and two ends of the second inductor are respectively coupled to two input ends of the hybrid rectification circuit; or
a first end of the first capacitor and a first end of the second inductor are respectively coupled to two output ends of the high-frequency inversion circuit, a second end of the first capacitor and a second end of the second inductor are respectively coupled to two ends of the first inductor, and two ends of the second inductor are respectively coupled to two input ends of the hybrid rectification circuit.

7. The resonant converter according to claim 1, wherein the hybrid rectification circuit comprises a second capacitor and a rectifier bridge, wherein a first input end of the rectifier bridge is coupled to a first end of the second capacitor, a second end of the second capacitor is coupled to a first output end of the LLC resonant tank network, a second input end of the rectifier bridge is coupled to a second output end of the LLC resonant tank network, and two output ends of the rectifier bridge are used as output ends of the resonant converter; and
the rectifier bridge comprises a plurality of switching transistors, or
the rectifier bridge comprises at least one diode and at least one switching transistor.

8. The resonant converter according to claim 2, wherein the hybrid rectification circuit comprises a second capacitor and a rectifier bridge, wherein a first input end of the rectifier bridge is coupled to a first end of the second capacitor, a second end of the second capacitor is coupled to a first output end of the LLC resonant tank network, a second input end of the rectifier bridge is coupled to a second output end of the LLC resonant tank network, and two output ends of the rectifier bridge are used as output ends of the resonant converter; and
the rectifier bridge comprises a plurality of switching transistors, or
the rectifier bridge comprises at least one diode and at least one switching transistor.

9. The resonant converter according to claim 2, wherein two ends of the third inductor are respectively coupled to two output ends of the high-frequency inversion circuit, and two ends of a secondary side of the transformer are respectively coupled to two input ends of the LLC resonant tank network; or
the two ends of the third inductor are respectively coupled to two output ends of the LLC resonant tank network, and the two ends of the secondary side of the transformer are respectively coupled to two input ends of the hybrid rectification circuit.

10. The resonant converter according to claim 3, wherein two ends of the third inductor are respectively coupled to two output ends of the high-frequency inversion circuit and two ends of a secondary side of the transformer are respectively coupled to two input ends of the LLC resonant tank network; or
the two ends of the third inductor are respectively coupled to two output ends of the LLC resonant tank network, and the two ends of the secondary side of the transformer are respectively coupled to two input ends of the hybrid rectification circuit.

11. A method applied to a resonant converter, wherein the resonant converter comprises a high-frequency inversion circuit, an inductor-inductor-capacitor (LLC) resonant tank network, a hybrid rectification circuit, a voltage conversion circuit, separately coupled to the high-frequency inversion circuit and the LLC resonant tank network, wherein the voltage conversion circuit comprises a transformer and a third inductor, two ends of the third inductor are respectively coupled to two ends of a primary side of the transformer, and the method comprises:
converting a first direct current voltage into a first alternating current voltage by using the high-frequency inversion circuit;
adjusting the first alternating current voltage by using the LLC resonant tank network to obtain a second alternating current voltage; and
enabling, when a direct current voltage adjustment gain falls within a first threshold range, the hybrid rectification circuit to work in a full-bridge rectification mode to convert the second alternating current voltage into a second direct current voltage for output; or
enabling, when a direct current voltage adjustment gain falls within a second threshold range, the hybrid rectification circuit to work in a voltage doubling rectification mode to convert the second alternating current voltage into a second direct current voltage.

12. The method according to claim 11, further comprising adjusting the first alternating current voltage by using the voltage conversion circuit to obtain a third alternating current voltage; and adjusting the first alternating current voltage by using the LLC resonant tank network to obtain the second alternating current voltage further comprises:

adjusting the third alternating current by using the LLC resonant tank network to obtain the second alternating current.

13. The method according to claim 11, further comprising:

adjusting the second alternating current voltage by using the voltage conversion circuit to obtain a fourth alternating current voltage; and the enabling, when the direct current voltage adjustment gain falls within the first threshold range, the hybrid rectification circuit to work in the full-bridge rectification mode to convert the second alternating current voltage into the second direct current voltage for output further comprises:

enabling, when the direct current voltage adjustment gain falls within the first threshold range, the hybrid rectification circuit to work in the full-bridge rectification mode to convert the fourth alternating current voltage into the second direct current voltage; or enabling, when the direct current voltage adjustment gain falls within the second threshold range, the hybrid rectification circuit to work in the voltage doubling rectification mode to convert the second alternating current voltage into the second direct current voltage further comprises:

enabling, when the direct current voltage adjustment gain falls within the second threshold range, the hybrid rectification circuit to work in the voltage doubling rectification mode to convert the fourth alternating current voltage into the second direct current voltage for output.

* * * * *